(12) United States Patent
West et al.

(10) Patent No.: US 6,252,910 B1
(45) Date of Patent: Jun. 26, 2001

(54) BANDWIDTH EFFICIENT QAM ON A TDM-FDM SYSTEM FOR WIRELESS COMMUNICATIONS

(75) Inventors: Randall J. West, Bedford; Alvin Dale Kluesing, Southlake; Robert Joseph McCarty, Jr., Rockwall, all of TX (US)

(73) Assignee: ComSpace Corporation, Coppell, TX (US)

( * ) Notice: Subject to any disclaimer, the term of this patent is extended or adjusted under 35 U.S.C. 154(b) by 0 days.

(21) Appl. No.: 09/295,660

(22) Filed: Apr. 21, 1999

Related U.S. Application Data

(60) Provisional application No. 60/107,934, filed on Nov. 11, 1998.

(51) Int. Cl.[7] ............................ H04L 5/12; H04L 23/02
(52) U.S. Cl. ...................................... 375/261; 375/298
(58) Field of Search .............................. 375/240, 259, 375/260, 261, 295, 298, 316, 324

(56) References Cited

U.S. PATENT DOCUMENTS

| 4,581,748 | * | 4/1986 | Sasaki et al. | 375/261 |
| 4,881,245 | * | 11/1989 | Walker et al. | 375/260 |
| 5,140,615 | * | 8/1992 | Jasper et al. | 375/347 |
| 5,170,413 | * | 12/1992 | Hess et al. | 375/260 |
| 5,519,730 | * | 5/1996 | Jasper et al. | 375/260 |
| 6,005,893 | * | 12/1999 | Hyll | 375/260 |

FOREIGN PATENT DOCUMENTS

| 2271693 | * | 4/1994 | (GB) | H04L/05/06 |
| WO 93/09622 | * | 5/1993 | (WO) | H04L/05/12 |
| WO98/09383 | * | 3/1998 | (WO) | H04B/1/66 |

* cited by examiner

Primary Examiner—Stephen Chin
Assistant Examiner—Lenny Jiang
(74) Attorney, Agent, or Firm—Slater & Matsil, L.L.P.

(57) ABSTRACT

Efficient usage of available spectrum is increased by logically dividing government licensed frequency channels into sub-channels, each of which can individually transmit a signal between a base unit and terminal. The sub-channels are each offset from the center of the frequency channel by a unique offset amount to avoid interference. Power control, sub-channel interference cancellation, and frequency control are employed to minimize the effects of out-of-band sub-channel signals on adjacent sub-channels. Any given sub-channel can be dynamically configured to transmit voice or data signals. Further spectral efficiency is realized using time division multiplexing on some or all of the sub-channels.

33 Claims, 11 Drawing Sheets

STAR QAM, 30msec SLOT, OUTBOUND, LTR

| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | SUM BY FUNCTION |
|---|---|---|---|---|---|---|---|---|---|---|---|---|---|---|---|---|---|---|---|---|---|---|---|---|---|
| SLOT NUMBER | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | |
| PRIMARY ERROR CONTROL WORD# | 0 | 0 | 1 | 1 | 2 | 2 | 3 | 3 | 4 | 4 | 5 | 5 | 6 | 6 | 7 | 7 | 8 | 8 | 9 | 9 | 10 | 10 | 11 | 11 | |
| LTR WORD# | 0 | 0 | 1 | 1 | 2 | 2 | 3 | 3 | 4 | 4 | 5 | 5 | 6 | 6 | 7 | 7 | 8 | 8 | 9 | 9 | 10 | 10 | 11 | 11 | |
| CRC BITS | 6 | 5 | 6 | 5 | 6 | 5 | 6 | 5 | 6 | 5 | 6 | 5 | 6 | 5 | 6 | 5 | 6 | 5 | 6 | 5 | 6 | 5 | 6 | 5 | 132 |
| LTR BITS | 12 | 12 | 12 | 12 | 12 | 12 | 12 | 12 | 12 | 12 | 12 | 12 | 12 | 12 | 12 | 12 | 12 | 12 | 12 | 12 | 12 | 12 | 0 | 0 | 264 |
| LTR FREQ. EXPAN. | 9 | 9 | 9 | 9 | 9 | 9 | 9 | 9 | 9 | 9 | 9 | 9 | 9 | 9 | 9 | 9 | 9 | 9 | 9 | 9 | 9 | 9 | 0 | 0 | 198 |
| SYSTEM CONTROL | 8 | 8 | 8 | 8 | 8 | 8 | 8 | 8 | 8 | 8 | 8 | 8 | 8 | 8 | 8 | 8 | 8 | 8 | 8 | 8 | 8 | 8 | 29 | 29 | 234 |
| COUNTER/BATT. SAVE | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 48 |
| RED/BLUE DEFINITION | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 12 |
| INFORMATION BITS IN SLOT | 37 | 37 | 37 | 37 | 37 | 37 | 37 | 37 | 37 | 37 | 37 | 37 | 37 | 37 | 37 | 37 | 37 | 37 | 37 | 37 | 37 | 37 | 37 | 37 | |
| CODED BITS IN SLOT | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | |
| POWER CONTROL INCREMENT | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 72 |
| CODED PCI BITS IN SLOT | 6 | 6 | 6 | 6 | 6 | 6 | 6 | 6 | 6 | 6 | 6 | 6 | 6 | 6 | 6 | 6 | 6 | 6 | 6 | 6 | 6 | 6 | 6 | 6 | 144 |
| TOTAL BITS IN SLOT | 80 | 80 | 80 | 80 | 80 | 80 | 80 | 80 | 80 | 80 | 80 | 80 | 80 | 80 | 80 | 80 | 80 | 80 | 80 | 80 | 80 | 80 | 80 | 80 | 1920 |

FIG. 7c

| CATEGORY | b15 | b14 | b13 | b12 | b11 | b10 | b9 | b8 | b7 | b6 | b5 | b4 | b3 | b2 | b1 | b0 |
|---|---|---|---|---|---|---|---|---|---|---|---|---|---|---|---|---|
| SERVICE OPTION | 0 | 0 | 0 | 0 | s11 | s10 | s9 | s8 | s7 | s6 | s5 | s4 | s3 | s2 | s1 | s0 |
| FREQUENCY | 0 | 0 | 0 | 0 | 1 | f10 | f9 | f8 | f7 | f6 | f5 | f4 | f3 | f2 | f1 | f0 |
| BASE SYSTEM GAIN | 0 | 0 | 0 | 1 | 0 | 0 | 0 | 0 | 0 | g6 | g5 | g4 | g3 | g2 | g1 | g0 |

FIG. 7e

| STAR QAM, 30msec SLOT, INBOUND, LTR | | |
|---|---|---|
| SLOT NUMBER | 0 | 1 |
| ERROR CONTROL WORD# | 0 | 1 |
| LTR WORD# | 0 | 0 |
| CRC BITS | 7 | 7 |
| LTR BITS | 12 | 12 |
| LTR FREQ. EXPAN. | 5 | 4 |
| SYSTEM CONTROL | 5 | 6 |
| SLOT COUNTER | 1 | 1 |
| POWER INDICATOR | 2 | 2 |
| INFORMATION BITS IN SLOT | 32 | 32 |
| CODED BITS IN SLOT | 64 | 64 |
FIG. 7d
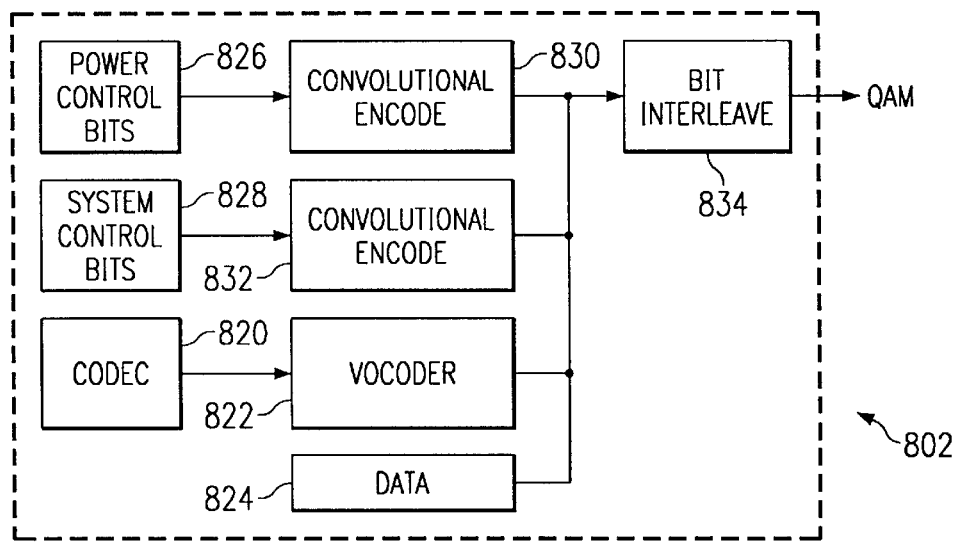
FIG. 8b
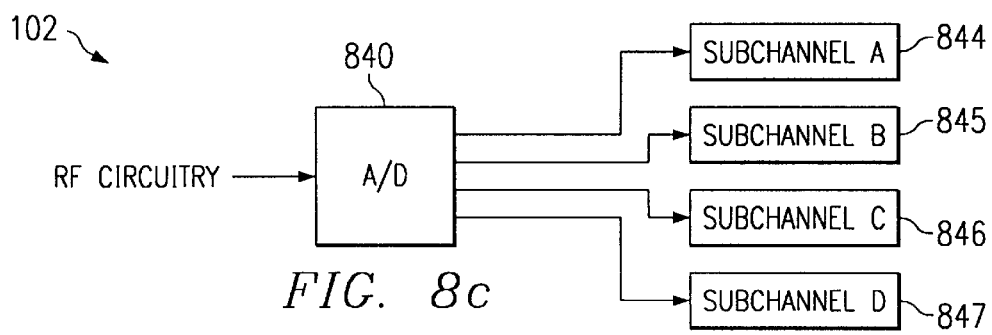
FIG. 8c

BANDWIDTH EFFICIENT QAM ON A TDM-FDM SYSTEM FOR WIRELESS COMMUNICATIONS

This application claims benefit of U.S. Provisional Application Serial No. 60/107,934 filed Nov. 11, 1998.

FIELD OF THE INVENTION

This invention relates to wireless communication and more particularly to a system for configuring digital communications on a fixed bandwidth RF channel to obtain increased channel capacity.

BACKGROUND OF THE INVENTION

A long-standing problem with wireless communications (and particularly in the context of RF communications) is the need to maximize spectrum efficiency. Spectrum efficiency refers to the most efficient use of the limited bandwidth that is set aside for a given type of wireless communication service. For instance, in the United States, the FCC has set aside the portions of the frequency spectrum from 851 to 869 MHz and from 806 to 824 MHz for trunked private two-way radio communications (the first portion of the spectrum being reserved for transmissions by a base unit and the latter portion being reserved for transmissions by mobile units). The reserved portion of the spectrum is divided into pre-defined frequency channels. A wireless communication system must be designed to transmit only within its defined channel or channels and must not interfere with (generate appreciable transmissions on) other channels within the spectrum. Channels are typically 30 kHz, or 25 kHz, or in some cases 12.5 kHz, depending upon the portion of the spectrum and the applications for which that portion of the spectrum has been reserved.

Competing with the need to maintain transmissions within a narrowly defined channel is the desire to maximize the throughput or utilization of the channel—i.e. to transmit as many communication paths between, e.g. mobile units and a base unit, as possible. Every communication path requires a certain amount of available bandwidth to transmit information (be it data, voice signals, or some combination).

In a trunked frequency division multiplexing system (FDM), each communication path is assigned to the next available frequency channel. In this way, only one communication path can be maintained at any one time on any given channel. As will be discussed below, actually two channels are used for two-way radio communications. The first channel, known as the forward channel, is used by the base unit to transmit to a mobile unit. The mobile unit transmits back to the base unit on a paired channel, referred to as the reverse channel.

In a time division multiplexing system (TDM), each channel is logically divided into several time slots. In this way, more than one communication path can be established on each channel, although only one communication path is active (i.e. transmitting) on the channel at any given instant. As an example, assume a TDM system in which the channel, the reverse channel, has been logically divided into two time slots. A first communication path can be allocated to the first time slot. The mobile unit will transmit during the first time slot only. A second mobile unit (establishing a second communication path) will transmit on the same frequency channel, but only during the-second time slot.

The base unit transmits information back to the mobile units on the forward channel, which is also logically divided into two time slots. The base unit transmits information to the first mobile radio during the first time slot of the forward channel and transmits information to the second mobile radio during the second time slot. Although the mobile units receive the base unit transmissions across both time slots, each mobile unit is instructed only to accept those transmissions which occur during the time slot associated with that mobile unit and to ignore the transmissions associated with the other time slot. In this way, two communication paths can be maintained on the same channel pair as was required for a single communication path on an FDM system.

Advances in the art have led to the recognition that a frequency channel can be sub-divided into separate sub-channels. As an example, a 25 kHz channel can be divided into sub-channels with sufficient guard bands to minimize interference between the sub-channels. In the prior art, it has been recognized that TDM communications can be made more robust by broadcasting across the four separate sub-channels in parallel, rather than broadcasting one signal across the full frequency channel. In other words, rather than transmitting one 64 kb/s signal in each time slot, the signal is broken into four (4) sub-channel signals, each of which transmits at a rate of 16 kb/s. This method does not increase the capacity of the channel, but does minimize undesirable effects of radio transmission, such as multi-path propagation interference and time delay spread. Those effects introduce distortion into the transmission, thus making the communication less robust and less reliable.

As demand for wireless communication increases, spectrum allocation has become increasingly important. One approach the FCC has taken to extracting more channels from the limited spectrum is to narrow the defined bandwidth of the channels—a technique known as channel splitting. Prior art systems, which are designed and implemented to rely upon the full bandwidth of a channel, must be redesigned and substantially retrofitted in order to operate within more narrowly defined channels. The burden and expenses associated with this is not justified—meaning that the prior art systems become obsolete as channels are re-defined to make more efficient use of the spectrum. In other words, the prior art systems are not scalable.

Another shortcoming of prior art devices is their limited ability to transmit only one type of information format (e.g. voice only, data only, voice and data) on a given channel. Because the prior art systems require the full channel bandwidth to transmit and because the receiving device must be programmed to recognize the type of information that is being transmitted on that channel, normally only one type of information can be transmitted on the channel at any given time.

An additional shortcoming of the prior art is the need to have enough power to generate a sufficient signal to overcome the inevitable noise that is introduced to the signal during transmission. As mobile devices become increasingly smaller and lighter, and as consumers come to expect longer battery operating times, the need to minimize the amount of power required to transmit becomes increasingly important. As the given transmission power of a mobile device is spread across a bandwidth (e.g. a 25 kHz or 30 kHz channel), the signal to noise ratio is reduced.

These and other shortcomings of the prior art are overcome in the preferred embodiments of the present invention, as will be described in more detail below.

SUMMARY OF THE INVENTION

The invention provides a method and apparatus for transmitting multiple information signals over a single pre-defined frequency channel. Each of the information signals is modulated and filtered to produce a modulated signal having a bandwidth of less than the bandwidth of the frequency channel. Each modulated information signal is then offset from its center frequency by an offset frequency individual to each modulated information signal. The offset modulated signals are then combined to form a composite signal and transmitted.

DESCRIPTION OF THE DRAWINGS

FIGS. 7(c) and 7(d) provide additional detail regarding the allocation of signal and control bits in the forward and reverse time frames, respectively.

FIG. 7(e) illustrates additional detail regarding the system control bits of the forward time frame.

FIGS. 8(a) through 8(f) are block diagrams of a preferred embodiment base unit.

BRIEF DESCRIPTION OF THE PREFERRED EMBODIMENTS

Figure 1A:
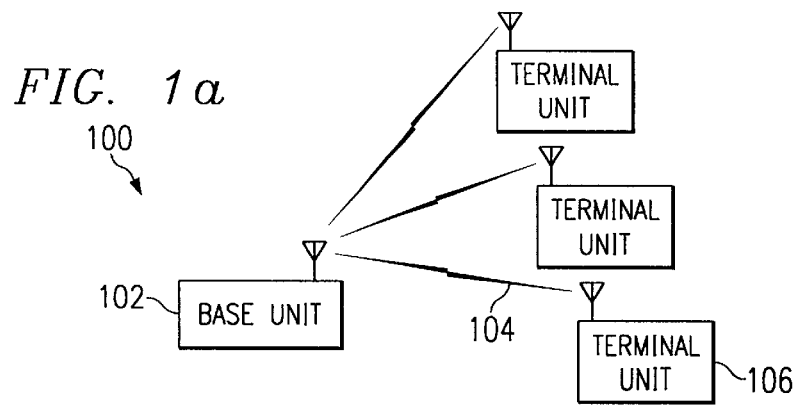
FIGS. 1(a) and 1(b) are block diagrams of preferred embodiment radio systems.

FIG. 1(a) illustrates an exemplary radio system 100. System 100 could be a cellular telephone system, a two-way radio dispatch system, a localized wireless telephone or radio system or the like. Base unit 102 can communicate over transmission medium 104 to one or more terminal units 106. Transmission medium 104 represents the wireless communication spectrum. Terminal units 106 can be mobile units, portable units, or fixed location units and can be one way or two way devices. Although only one base unit is illustrated the radio system 100 may have two or more base units, as well as interconnections to other communication systems, such as the public switched telephone network, the internet, and the like. In the preferred embodiment, the system provides for full duplex communications. The teachings of the present invention, however, apply equally to half duplex systems, as well as to time division duplex, simplex and other two-way radio systems.

Figure 1B:
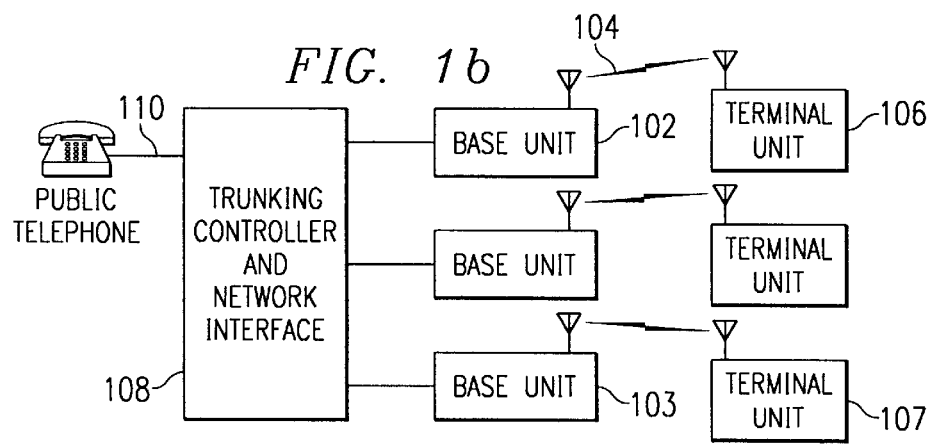

In some preferred embodiments, each base unit 102 transmits on only a single (e.g., 25 kHz bandwidth) frequency channel. Hence for a system that is licensed to operate on ten channels, ten base stations would be required. In alternative embodiments, the base station can be configured to transmit and receive across multiple channels. This feature would be particularly beneficial for those systems which are licensed to operate across several contiguous channels. With such a system, inter-channel guard-banding requirements could be relaxed, allowing for greater bandwidth efficiency. FIG. 1(b) illustrates an exemplary system 100 wherein the operator is licensed to transmit on three FCC licensed channels. Throughout the following description, common elements in the various drawings will be given like reference numerals. Three base units 102 are required, one for each frequency channel, and a base unit controller and network interface 108 is provided for synchronizing the activities of the base units 102 and for interconnecting communications across the base units. For instance, in the case of an end-user using terminal unit 106 desiring to communicate with an end-user using terminal unit 107, the communication path would involve terminal unit 106 transmitting its signal to base unit 102. Base unit 102 would receive the signal, demodulate it, error correct it, convert it to base-band, decode the signal and would then pass the audio signal (in the case of a voice signal) or the data signal to base unit 103, via base unit controller and network interface 108. Base unit 103 would then encode the information, modulate it, and transmit it to terminal unit 107 on a separate channel. FIG. 1(b) also illustrates connection 110 to the public telephone switched network. Alternatively or additionally, connection 110 may connect system 100 to an internet, a satellite based communication system, a WAN, or some other communication network.

As is well known, radio frequency communications must be transmitted at certain defined frequencies, or more accurately, must be transmitted within defined bandwidths, or channels, centered about defined frequencies. These channels are defined by the appropriate governing authority and are allocated for various spectrum users. In the United States, the Federal Communications Commission administers and allocates spectrum usage.

Radio frequency channels for two-way radio communications are typically defined at 30 kHz, 25 kHz, or in some cases 12.5 kHz wide. Channels of 6.25 kHz and 5 kHz are also known. Out of channel transmissions must be carefully limited in order to prevent transmissions on one channel from interfering with communications on adjacent channels.

Figure 2A:
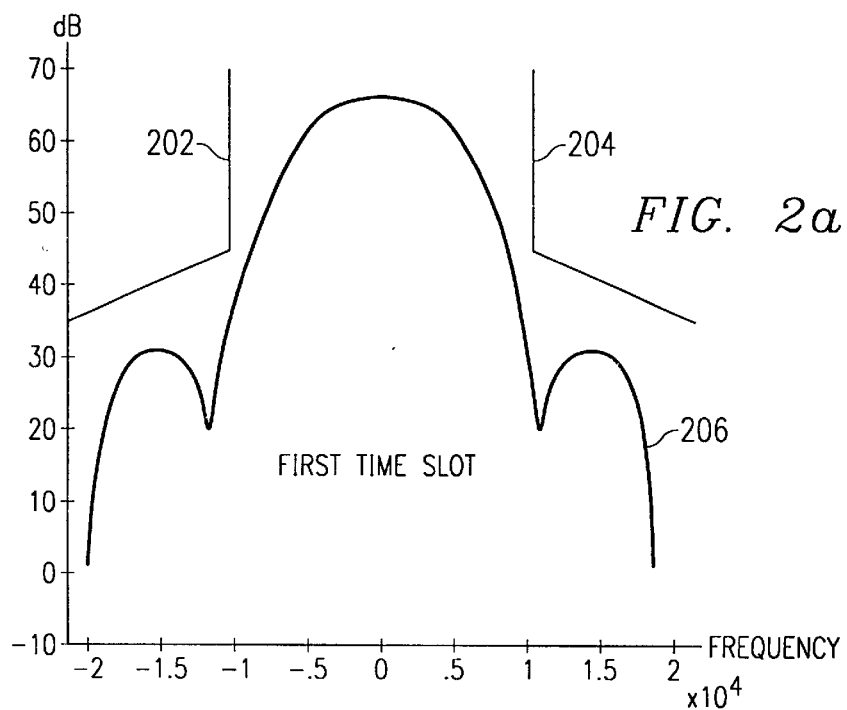
FIGS. 2(a) and 2(b) illustrate an emissions mask for a prior art system using time domain multiplexing (TDM) on a 25 kHz channel.
Figure 2B:
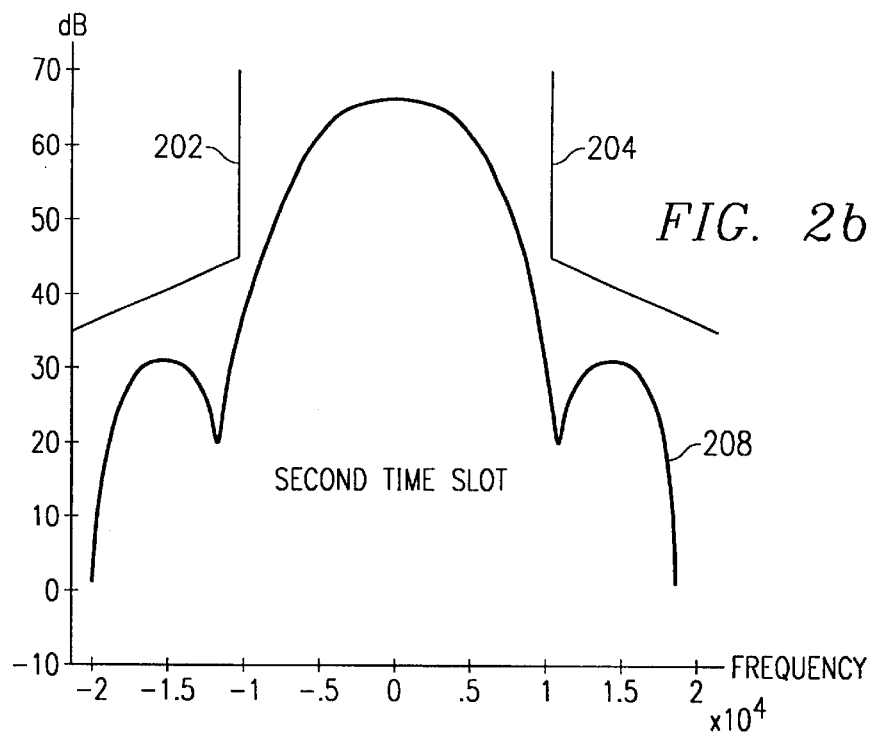

FIGS. 2(a) and 2(b) illustrate an emissions mask for a prior art system using time domain multiplexing (TDM) on a 25 kHz channel. The channel is centered about a channel frequency f0 and extends plus or minus 12.5 kHz on either direction of the center frequency. Note that under FCC regulations, emissions drop off rapidly at the edges of the channel and must be −25 dB at the frequency limits of the channel (i.e. at plus or minus 12.5 kHz). A typical emissions mask is illustrated by the bold curves 202, 204 of FIGS. 2(a) and 2(b). Note that the entire available channel, less reserved portions for guard-bands, is occupied by a single, roughly 20 kHz wide signal, representing a single communication path between a base unit and a terminal unit(s).

During TDM time slot one, illustrated in FIG. 2a, a first terminal unit has access to the channel and only it may transmit to the base unit (on that channel). The transmissions from the first terminal unit are illustrated (in the frequency domain) by the curve 206. During the second time period, illustrated in FIG. 2b, a second terminal unit has access to the channel and only it may transmit to the base unit (on that channel), as shown by curve 208. During this second time period, the first terminal unit may not transmit. In this way, contention between the first and second terminal units is prevented. Note that during the second time period although the first terminal unit may not transmit, it may receive transmission from the base unit being transmitted over the forward channel (on a different frequency channel). Likewise, the second terminal unit may receive transmissions from the base unit during the first time period, although it may not transmit during this time.

There is a limit to the number of time slots that can be practically used. In order to transmit voice data, for instance, it is desirable that the received signal appear to the listener to be continuous, as natural communication occurs. It would be undesirable for the received signal to be perceived as coming in spurts with intermittent periods of silence. This is avoided, for a TDM system with two time slots, by taking the continuous signal to be transmitted and transmitting it at twice the normal data rate for half the time. For a system with three time slots, the signal would have to be transmitted at three times the normal data rate, during the one third of the time allocated to a given communication path. Eventually, the maximum data transmission rate of the channel will be reached.

For a typical 25 kHz channel, up to a maximum of 20 kHz is available for signal transmission (the remaining 5 kHz being reserved for guard-banding.) Currently, the maximum practical data rate for a 20 kHz channel is about 64 kbits/sec (assuming a 16 QAM system). Assuming the normal data rate of the signal to be transmitted (as a function of the vocoder, the forward error correction, and miscellaneous control over head bits) is 8 kb/s, the maximum number of time slots that could be transmitted over the channel would be eight. This is because the signal would need to be transmitted at eight times the normal rate (i.e. at 64 kb/s) during the one eighth of the time allocated to each communication path. In many systems, at least one time slot is reserved for control signals, which would further limit the number of time slots available for voice signal transmission. As technology advances, improved vocoders and other system components may make possible acceptable signal quality at lower data rates. An advantage of the preferred embodiments is the ability to adjust the number of time slots, length of time slots, and the like, as the capabilities of system components advance.

Figure 3:
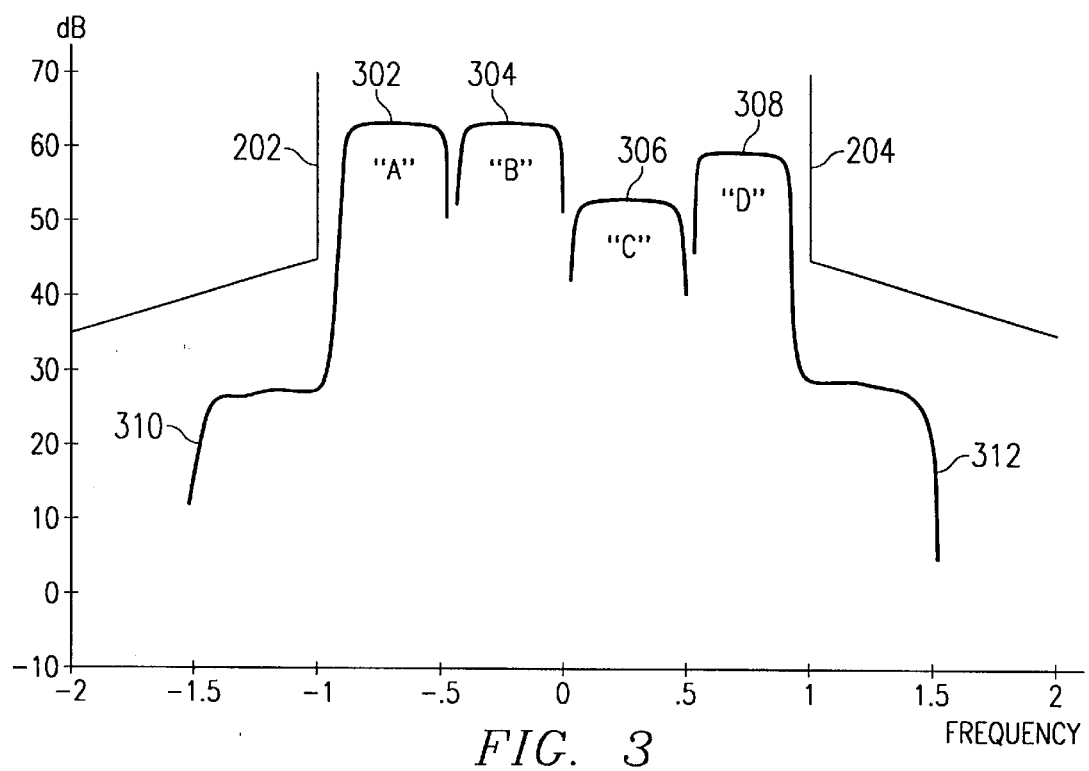
FIG. 3 illustrates an emissions mask for a 25 kHz channel that has been divided into separate sub-channels.

FIG. 3 illustrates an emissions mask for a 25 kHz channel that has been divided into separate sub-channels. In the preferred embodiment, the FCC defined 25 kHz channel is divided into four sub-channels of 4 kHz each. The sub-channels are separated from each other by 800 Hz guard-bands, and the channel has guard-bands on the sides as well to prevent inter-channel interference. The multiple sub-channels can be broadcast over a single channel by offsetting each of the sub-channels from the center frequency of the channel by an frequency offset that is unique or individual to each such sub-channel. The offset sub-channels are then combined into a composite signal before being transmitted over the channel. At the receiving end, the sub-channels can be separated by offsetting the received composite channel by an offset frequency sufficient to re-center the desired sub-channel information signal back to the center frequency of the channel itself and then filtering out the remaining sub-channel signals. This process can be repeated for two or more sub-channels if it is desired to transmit information to a given terminal over two or more sub-channels.

In the preferred embodiment the center of Sub-channel A is offset from the center frequency of the channel by −7.2 kHz, i.e. the sub-channel is 4 kHz wide and is centered about a frequency offset from the channel frequency f0 by −7.2 kHz. Sub-channel B is offset from the center frequency by −2.4 kHz, sub-channel C is offset by 2.4 kHz and sub-channel D by 7.2 kHz, as shown. Subchannels A, B, C, and D are illustrated by frequency domain curves 302, 304, 306, and 308, respectively in FIG. 3. Note that out-of-band emissions are also illustrated in FIG. 3, as curves 310 and 312. These curves represent noise as well as side-band signals associated with the four sub-channels. Such noise and side-band signals also occur within the four sub-channels, but will not interfere with the desired signal, provided the signal to noise ratio is adequate.

Each sub-channel corresponds to an available communication path between the base unit and a terminal unit. More accurately, in the preferred embodiment, because of time division multiplexing, each sub-channel is time divided into two time slots for voice or data traffic, hence each sub-channel represents two communication paths. In this way, up to eight separate communication paths can be established on a standard 25 kHz channel. In fact, as shown, the four sub-channels and sufficient guard-banding only occupy about a 20 kHz bandwidth. Note that, even without TDM, up to four communications paths can be established on a single 25 kHz channel. As will be apparent to one skilled in the art, the teachings of the preferred embodiments can be applied to other organizations, such as additional time slots and/or narrower (or wider) sub-channels as permitted by the desired data rates and capacity needs.

Note that the signal being carried on sub-channel C is shown as being weaker (lower magnitude) than the signal on adjacent sub-channels B and D. This may be because the terminal unit transmitting on sub-channel C is further away from the receiving base unit than the terminal units transmitting on the adjacent sub-channels. In order to prevent a sub-channel's signal from being swamped out by the side-band signals of the adjacent sub-channels, guard-bands are employed (additionally, sub-channel interference cancellation routines are used, as discussed in detail below). In the preferred embodiments, the sub-channels are separated by 800 Hz guard-bands. Additionally, as will be discussed in greater detail below, the system 100 employs a transmission gain feedback loop between the base unit and the terminal units. When the base unit detects that a terminal unit's signal is weak relative to the signals received on the other sub-channels, the base unit will instruct the terminal unit to increase its transmission gain, as will be discussed in more detail below.

Figure 4A:
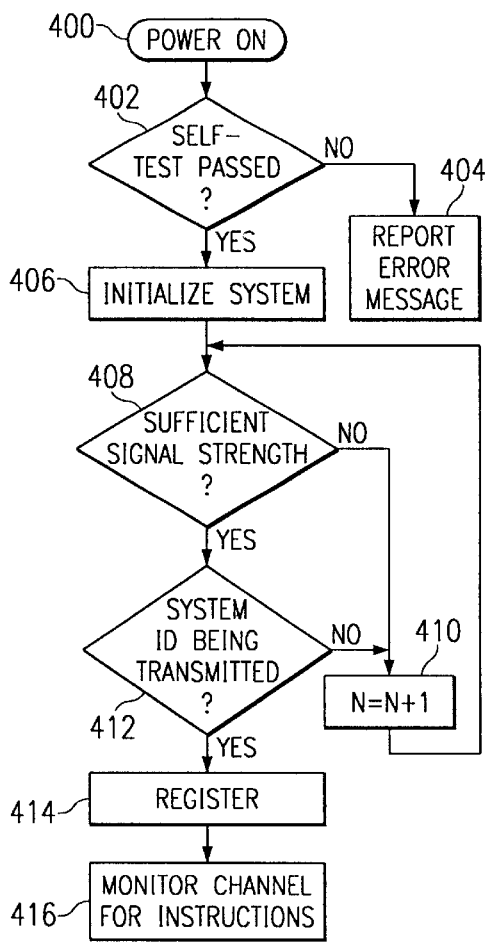
FIG. 4(a) is a flow-diagram illustrating how a terminal unit initiates contact with a base unit.
Figure 4B:
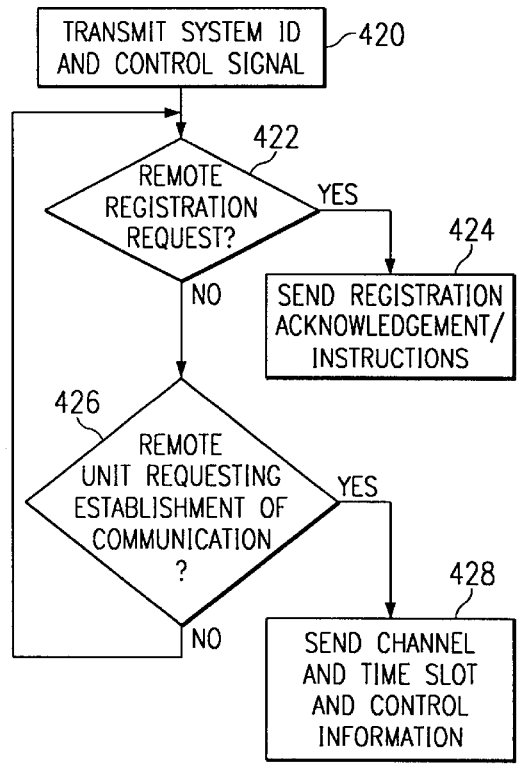
FIG. 4(b) is a flow diagram illustrating how a base unit initiates contact with a terminal unit.

FIG. 4 illustrates in a flow-diagram format how contact is initiated between a terminal unit and the base unit and how terminal units are allocated to a given channel, sub-channel and time slot.

The process begins at step 400 at which point the terminal unit is powered up and runs a self-check routine. At step 402 the success of the self-test is determined. If successful, processing proceeds to step 406 wherein the system runs various initialization routines, as are well known in the art. If the self-test fails, an error message is reported to the end-user via an LCD display, an audible signal, or the like and processing halts at step 404.

Once the terminal unit is initialized, it begins to monitor certain pre-assigned channels that have been licensed for use by the system of which the terminal unit is a part, as shown in step 408. As each channel is monitored, the terminal unit detects the level of signal strength being received on the channel. In the preferred embodiments, certain time slots of selected sub-channels of selected channels are pre-defined in the terminal. Alternatively, the terminal could scan all available time slots, sub-channels, channels to look for an acceptable signal. If the signal strength on the channel is not sufficient, the terminal unit increments to the next pre-assigned channel and monitors that channel to see if it has sufficient signal strength, as in step 410. It continues to search until an acceptable channel is found. The term sufficient signal strength is being used in a shorthand manner here to include also determining that the signal being received on the channel is of the correct format. For instance, a strong signal may be being received on a channel, but if the received signal is an analog FM signal, whereas the terminal is looking for a DCMA signal, then the channel will not be acceptable, and the terminal will increment to the next channel. If no acceptable channel is found, the terminal unit will start again at the lowest pre-assigned channel and increment through the channels until a channel with sufficient signal strength is located. In some embodiments, the search for an acceptable channel does not start at the lowest channel, but rather starts as a channel that is "remembered" by the terminal. In one instance, the terminal may store in memory the acceptable channel that was found during the most recent session. In another instance, the terminal may store in memory a list provided by a base unit in a prior session of the most likely channels to search.

Alternatively, upon a failure to find a channel of sufficient signal strength, the terminal unit will alert the end-user that no service is available. The number of channels licensed for use by a given system is a design choice depending upon the anticipated traffic (i.e. the likely number of users that will use the system at any given time) and the sensitivity to call blocking (due to no channels being available when a user seeks to initiate a call). Typically, a system may be designed with three channels, equaling 24 simultaneous conversation or communication paths under the preferred embodiments of the invention wherein each channel is divided into four sub-channels, each of which is time division multiplexed into two voice (or data) time slots. For high traffic, large scale systems, ten, fifteen or more channels may be licensed.

Once an acceptable channel is found, processing continues to step 412, where the terminal unit determines if the channel is one intended for use by the system. This is determined by monitoring the channel for a unique system identification that is transmitted by the base unit on a continuous or intermittent basis. If the system ID is not received, the terminal unit must continue the search for an authorized, channel and processing continues at step 410 where the channel is incremented. If a system ID is received, processing continues to step 414, wherein the terminal unit registers with the base unit by transmitting a unique identifying number on the channel. The system is preferably designed such that the terminal unit has programmed into it sufficient instructions so as to transmit its registration number on a pre-selected sub-channel and during a pre-selected time slot. Alternatively, the terminal unit may be programmed to monitor each time slot of each sub-channel, for each channel used by the system, and to transmit its registration to the base station during the first idle time slot found on the first acceptable sub-channel determined. In other embodiments, the steps of checking for an ID being transmitted (412) and registering (414) may be omitted, and the terminal simply monitors the first channel it finds that has sufficient signal strength.

Processing then continues to step 416 where the terminal unit monitors the idle channel and awaits instructions from the base unit. In response to the registration, the base unit will check the registration number of the terminal unit against information stored in or accessible to the base unit to determine the status of the terminal unit, i.e. is the terminal unit recognized by the base station, is the terminal unit authorized to transmit on the system, are there class of service limitations on the unit, and the like.

Once the base unit determines that the registering terminal is authorized, it may be desirable for the base unit to provide instructions to the terminal unit, including instructions to begin monitoring a different channel (sub-channel, time slot). For efficiency, the system may be designed such that all registered idle terminal units are instructed to monitor a certain frequency and time slot for instructions. Alternatively, the base unit may simply acknowledge the registration to the terminal unit and make note of the fact that the newly registered terminal unit is monitoring the channel and sub-channel upon which the unit registered. Any subsequent instructions, including requests to initiate communication, with the terminal can then be transmitted over the sub-channel the terminal is monitoring. An advantage of the preferred embodiments is the ability to change the procedure and protocols by which the terminal establishes contact with the base unit without extensive retrofitting. This can be accomplished by re-programming the terminal, which re-programming can be accomplished via the system control bits that are transmitted by the base unit, as discussed further below. For instance, each terminal could be pre-programmed with a single home channel (sub-channel, time slot) upon which the base station continuously transmits control signals and instructions. This home channel could alternatively provide for both voice and control signals or could be dedicated to control signals only, depending upon the desired application.

FIG. 4(*b*) illustrates the steps by which the base station initiates communication with terminal units either registering or requesting the establishment of a communication path. FIG. 4(*b*) illustrates operations for a system 100 such as shown in Fig.1(*b*) wherein each base unit operates at only one channel frequency. Alternatively, the steps of FIG. 4(*b*) could be expanded to encompass more than one channel as will be readily seen by those skilled in the art. In step 420, the base station transmits a system identification on the channels. Preferably the system identification contains information understandable to the terminal units, such as an identifying number that can be compared to pre-stored information contained within the terminal units. Alternatively, the system identification could simply be a tone or simple signal that indicates to the terminal units that the sub-channel is otherwise available. Additionally, the base unit transmits control information during each time slot, as will be discussed in more detail below.

As shown in step 422, the base unit also monitors the channel for a registration request by a terminal unit. If a registration request is received, the base unit responds in step 424 with an acknowledgement and/or instructions as discussed above with reference to FIG. 4(*a*). The base unit also monitors the channels to determine if a terminal unit is requesting the establishment of a communication path, as shown in step 426. If no registration or communication requests are received, processing loops back to step 422. If a communication request is received, the base unit must determine the class of service being sought in the communication request, must allocate a sub-channel and time slot for the requested communication, and must send sufficient instructions, including sub-channel and time slot information back to the terminal unit to establish the communication path, as represented by step 428.

Various well known protocols could be employed for communications between base units and terminals. The above description is based upon Logic Trunked Radio (LTR) protocols, with some modifications. Several other protocols could be employed, including LTR Net, Passport, ESAS, TETRA, MPT1327, EDACS, PrivacyPlus, and the like while still realizing the advantages of the present invention.

Figure 5A:
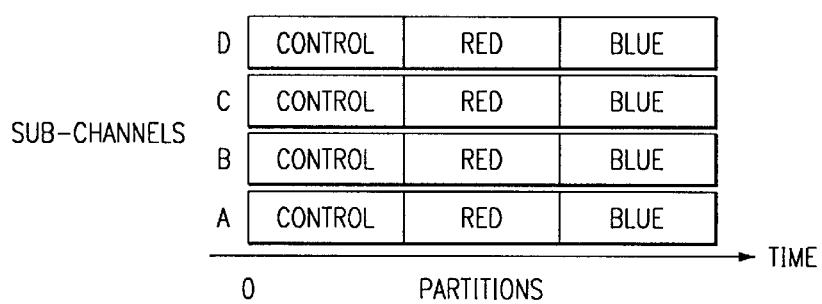
FIGS. 5(a) and 5(b) illustrate preferred time frame organizations.
Figure 5B:
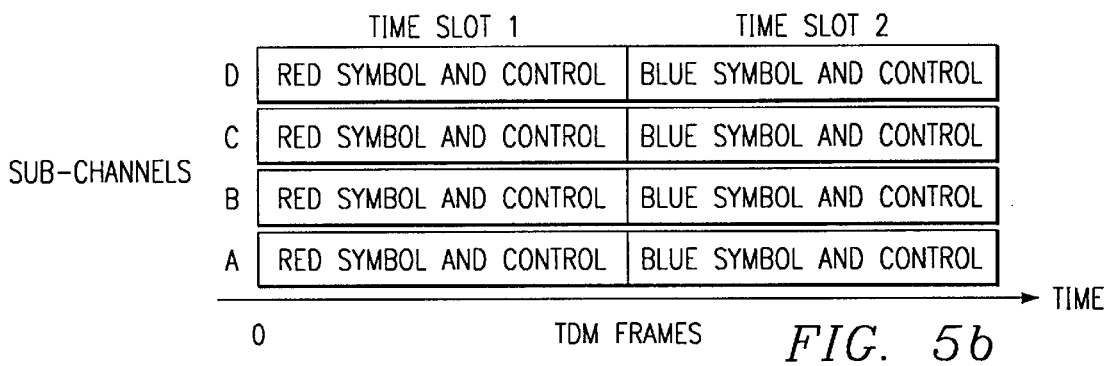

FIGS. 5(a) and 5(b) illustrate alternative embodiments of the time multiplexing architecture of the system. In FIG. 5(a) each frame consists of three partitions: a control time slot, a red time slot, and a blue time slot. The terms red and blue time slots are arbitrary references to distinguish between a first and second time slot. During the control time slot, control and synchronization information is exchanged between the base unit and terminal unit(s), such as power control instructions, packet length arbitration, system ID information, and the like as will be discussed in greater detail below. During the red time slot, a first terminal unit can transmit voice and/or data information to the base unit and during the blue time slot a second terminal unit can transmit voice and/or data. A more preferred embodiment is illustrated in FIG. 5(b) wherein each frame consists of two time slots. In FIG. 5(b), each time slot is preferably 30 ms long and control and synchronization information for each terminal unit is integrated in with the voice and/or data signals. Note that a first terminal unit will transmit over the sub-channel during the red time slot, and can receive information and instructions during the blue time slot. Likewise, the second terminal unit will transmit over the sub-channel only during the blue time slot, and can receive information and instructions during the red time slot.

In the preferred embodiments the red and blue time slots can be dynamically changed in order to maximize the flexibility of the system in responding to changing load commands. As illustrated, the red and blue time slots are of equal length, each transmitting half the time at 16 kb/s. This is the preferred default system configuration and would support approximately 200 terminal units per sub-channel. Alternatively, either the red or blue time slot could transmit during the entire time frame at 16 kb/s. Such a configuration would allow for superior signal (voice) quality and/or large data throughput, although the system capacity would be limited to approximately 100 terminal units per sub-channel with acceptable blocking levels.

In other embodiments, either the red or blue time slot, or both, could be further sub-divided into several time slots. Such a configuration would be useful when the system traffic involves numerous data packages, such as short text messages or paging services or for use with lower rate vocoders.

In the preferred embodiments two 30 ms time slots comprise one time frame. Alternate embodiments might employ more time slots of different durations. As the time slots become of shorter duration, the amount of overhead information (synchronization, start and stop bits and the like) transmitted as a percentage of each time slot becomes impractical. Likewise, on the other end of the spectrum, as time slots become of too long a duration, say around 150 ms, latency, i.e. the delay between subsequent time slots dedicated to a given communication path becomes noticeable. Latency is a particular problem with voice communications in which the end-user expects an immediate response from the receiving end. With data communications, latency is not as crucial and longer duration time slots could be acceptable.

Alternative levels of security can be provided as well. For instance, for a high security environment, encryption and/or scrambling techniques can be provided full time, at 16 kb/s. For normal security environments, encryption and or scrambling be provided at half time at 16 kb/s. The sub-channels can be employed to provide for a less costly security technique employing frequency and/or time hopping over the four sub-channels and the two time slots per channel.

Figure 6A:
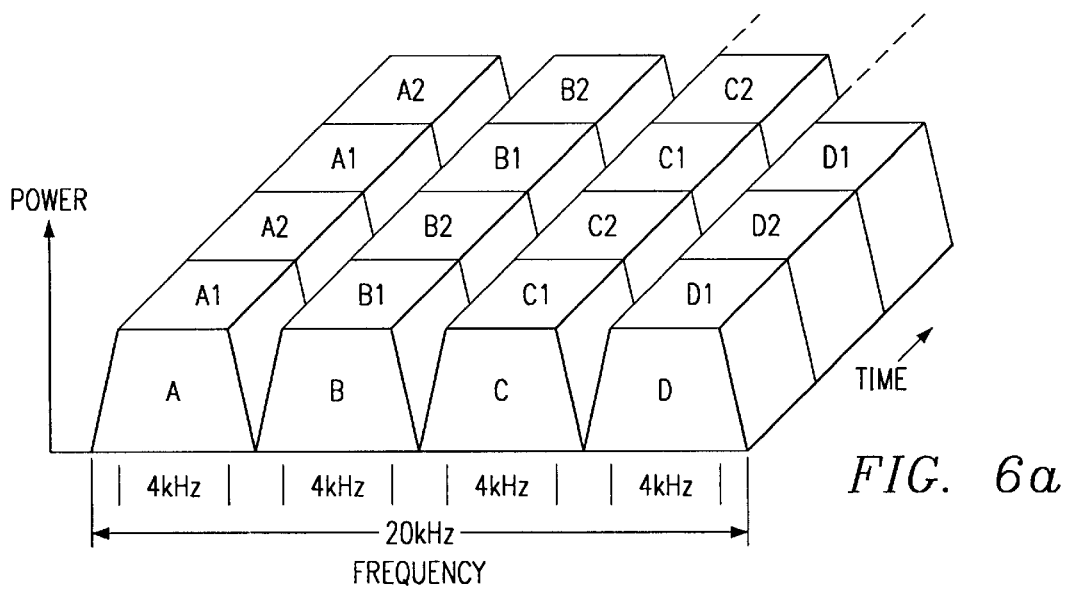
FIGS. 6(a) through 6(c) illustrate the ability to scale the preferred embodiment system to accommodate channels of different bandwidths.
Figure 6B:
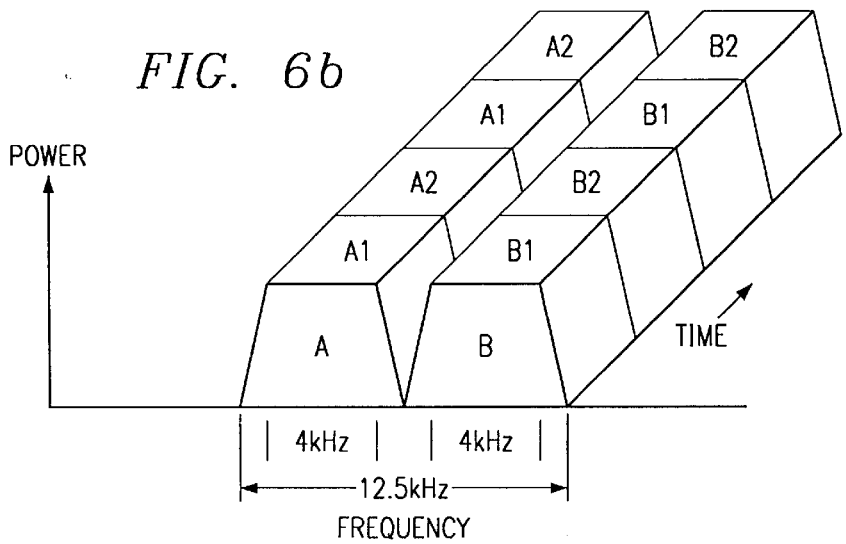
Figure 6C:
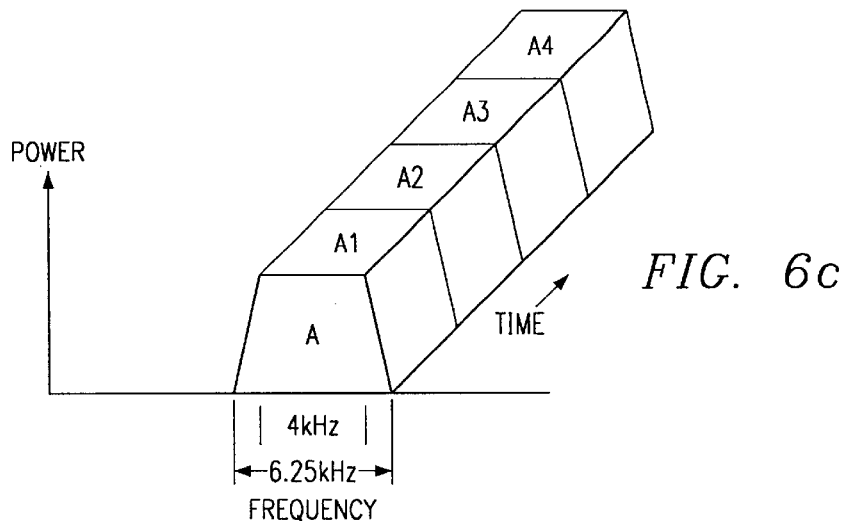

FIGS. 6(a) through 6(c) illustrate the architecture of a single channel of the multi-channel system 100 showing how a channel is divided in both the frequency domain and the time domain to provide multiple communication paths and illustrate the unique scalability of the preferred embodiments of the present invention. In FIG. 6(a), a 25 kHz channel is illustrated providing for eight communication paths, i.e. eight simultaneous (or nearly simultaneous as only half of the terminals will be transmitting during any given 30 ms time slot) transmissions between the terminal units and the base unit; actually only 20 kHz bandwidth is required, as illustrated. In FIG. 6(a), the channel is frequency divided into four 4 kHz sub-channels, each of which is time divided into time frames of two time slots per frame. Two such frames are illustrated for each sub-channel in the figure. A first terminal unit, A1 (not shown),can transmit on sub-channel A during the first time slot and a second terminal unit, A2, can transmit on sub-channel A during the second time slot. Likewise a third terminal unit, B1, can transmit on sub-channel B during the first time slot and a fourth terminal unit, B2, can transmit on sub-channel B during the second time slot. Likewise, sub-channels C and D are time multiplexed to allow two terminal units to transmit on each.

A desirable advantage of the preferred embodiments is the ability to easily adapt the system to new channel bandwidths. For instance, FIG. 6(b) illustrates a 12.5 kHz bandwidth channel. Note that this narrower channel can accommodate only two 4 kHz sub-channels and guard-bands, the sub-channels being offset from the center frequency of the channel by plus or minus 2.4 kHz. Each sub-channel is time divided into two time slots, allowing for up to four simultaneous users on the single channel.

The preferred embodiments can be easily scaled to accommodate such a channel because each communication path requires only 4 kHz (plus appropriate guard-bands). The base unit can be easily and inexpensively re-programmed to allocate only two sub-channels per channel. Because the terminal units are already programmed to expect to find sub-channels at the plus or minus 2.4 kHz offsets, the terminal units do not need to be retrofitted or re-programmed in order to accommodate the narrower channel. By contrast, in or with prior art systems that transmit over the entire channel bandwidth (less guard-bands), extensive retrofitting would be required of both the base station and the terminal units to modify them to transmit over a narrow channel bandwidth.

FIG. 6(c) illustrates the advantages of the preferred embodiments applied to a very narrow 6.25 kHz channel. Note that this very narrow channel can accommodate only a single 4 kHz sub-channel. In the preferred embodiments, this single channel is centered about the center frequency of the channel and is time divided into two time slots. Some re-programming may be necessary in order to align the terminal units on the non-offset sub-channel. This re-programming, however, can be done "on the fly" and transmitted along with the control and synchronization instructions, as discussed in more detail below.

Figure 7A:
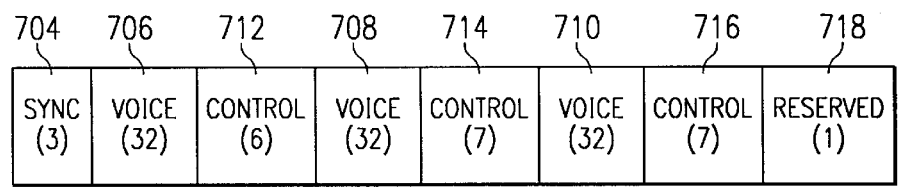
FIGS. 7(a) and 7(b) illustrate the organization of a single forward time slot of information and a single reverse time slot of information, respectively.
Figure 7B:
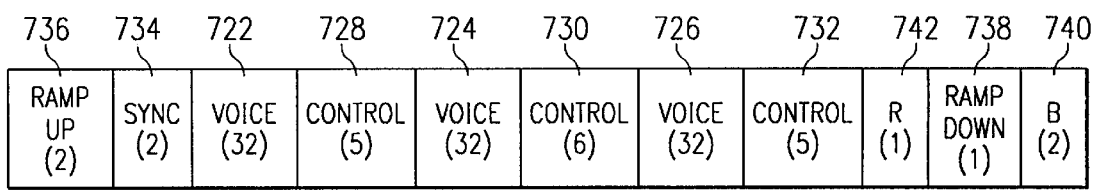

The control and synchronization signals are illustrated in more detail in FIGS. 7(a) and 7(b). FIG. 7(a) illustrates the structure for a single time slot 702 on the forward channel, i.e. transmitted from the base unit to a terminal unit. Time slot 702 is logically divided into synch, control, and voice portions. Each outbound (i.e. forward channel) time slot begins with a synchronization portion 704 to allow for timing synchronization between the base and terminal unit (s). In the preferred embodiment, sync portion 704 is three symbols long. Each symbol is preferably associated with four bits of data. The value of each symbol is determined by the phase and amplitude change between the time of the impulse at the start of the symbol period and the time of the impulse at the start of the next symbol period. Alternatively, the value of each symbol could be determined by the absolute phase and amplitude at a particular point within the symbol period. The former technique is known as differentially coherent modulation and the latter as coherent modulation.

In the preferred embodiment, each symbol period is about 250 $\mu$s in duration. As such, 120 symbols can be transmitted during the 30 ms time slot 702. Voice or data is transmitted during the voice portions of the time slot 706, 708, and 710. Each voice portion transmits 32 symbols of information, as indicated by the numbers in parentheses. Control signals are interleaved with the voice information, as shown by control portions 712, 714, and 716, providing a total of 20 symbols of control information per slot. Finally, a one symbol portion of the slot 718 is reserved for future needs.

The first data symbol value (in the case of time slot 702, the first voice symbol of voice portion 706) will be equal to the phase and amplitude change between the impulse time of the last symbol period of sync portion 704 and the impulse time of the first symbol of voice portion 706. The last symbol will be equal to the phase and amplitude change between the $119^{th}$ impulse time and the $120^{th}$ impulse time. A base generated time slot 702 begins with the first impulse and ends immediately before the $121^{st}$ impulse, which is the first impulse of the next time slot. In the event there is no information (voice or data) to be transmitted, a pseudo-random pattern will be inserted into the voice portions of the slot and transmitted along with control signals. Note that for purposes of demonstrating the logical structure, voice and control symbols are shown separately. In actual practice, prior to transmission, the voice and control bits are interleaved prior to QAM modulation, such that voice bits and control bits can be interleaved in the same symbol for transmission.

FIG. 7(b) illustrates the organization of a time slot 720 transmitted by a terminal unit. As with the base unit generated time slot, time slot 720 is 30 ms long, providing for 120 symbols of 250 $\mu$s duration. Voice portions 722, 724, and 726 are interspersed with control portions 728, 730, and 732. Time slot 720 provides for a two symbol long sync portion 734. The first data symbol for time slot 720 will be equal to the phase and amplitude change between the last sync impulse of sync portion 734 and the first impulse of voice portion 732. The last data symbol will be the phase and amplitude change between the $114^{th}$ and $115^{th}$ impulse times (i.e. the second to last and last impulses of voice portion 726).

As discussed above, a terminal unit transmits only during its assigned time slot, then turns its transmitter off. Time slot 720 provides for a ramp up period 736 of two symbols duration and a ramp down portion 738 of one symbol period duration. The ramp periods are used to control out-of-band energy and to allow the terminal unit to stabilize after the transmitter is turned on prior to transmitting during the time slot and to avoid signal degradation due to the effects of the transmitter beginning to power off at the end of the time slot. Further protection is provided by a blank portion 740 of two symbol periods duration to compensate for propagation delay at the end of the time slot (i.e. to ensure that a signal received from a far removed terminal does not overlap with the signal received from a near by terminal due to the differing propagation delays associated with the near and far terminals) Due to these signal ramp up and dead symbol periods, a terminal generated time slot will not begin and end with a symbol period that contains an impulse. Ideally, a time slot generated by a terminal unit will begin at the same time as the base unit generated time slot and the impulses generated by the terminal unit will be coincident with impulses generated by the base unit. Propagation delays, however, prevent this ideal alignment. For this reason, sync symbols are inserted in the terminal unit signals. Additionally, time slot 720 has a reserved portion 742 of one symbol duration for future expansion. In some preferred embodiments, the reserved symbols 718, 742 are used for additional symbol synchronization control. In the currently preferred embodiment, reserved symbol 742 is used for a ramp down signal.

Further information will now be provided regarding the control signals. Note that there are a total of 20 control symbols in a each forward channel time slot. With 16 constellation QAM modulation, each symbol represents four bits, providing for a total of 80 bits of control information per slot. In the preferred embodiments, the time slots are logically grouped into a "super frame" and control words (consisting of multiple control bits) are allowed to extend across more than one time slot. This is illustrated in FIGS. 7(c) and 7(d).

FIG. 7(c) illustrates the details regarding the 80 control bits (20 control symbols) of the time slot illustrated in FIG. 7(a). The figure also illustrates the organization of a preferred "super frame" consisting of 24 consecutive time slots (numbered 0 through 23 as shown by Row 1). Note that the control bits are organized into Primary Error Control Words, numbered 0 through 11 (Row 2). Each Primary Error Control Word is 74 bits in length extending over two consecutive time slots. Each Primary Error Control Word consists of (Rows 4–9): 11 cyclic redundant check bits (CRC), six in the first slot and five in the second slot; 42 Logic Trunked Radio words bits, consisting of twelve LTR bits and 9 LTR Frequency Expansion bits per slot; sixteen System Control bits; four Counter/Battery Save bits; and a Red/Blue Definition bit. Note that FIG. 7(c) does not illustrate how the bits are actually interleaved prior to transmission.

The Cyclic Redundant Bits provide redundant bits inserted into the signal for error detection. System Control bits provide for various service options as are discussed below with reference to FIG. 7(e). The Counter/Battery Save bits can be used to turn off a terminal unit for a number of time slots during which the terminal unit will be inactive, in order to save battery life of the terminal unit. The Red/Blue Definition bit is included in every other slot, and controls whether the slot is defined as the red time slot or the blue time slot.

The LTR Word is organized with modified LTR protocol as follows: One bit defines the area or geographical location; 14 bits define a GOTO field that advises the terminal on the home channel to go to receive messages; an eight bit ID field and a five bit HOME field function as an ID signal; and the remaining 14 bits define a FREE field which identifies a free channel to go to in order initiate transmissions. The standard LTR protocol has been modified by expanding the FREE and GOTO fields to fourteen bits, from five, in order to include instructions for identifying the appropriate RF channel, sub-channel, and time slot.

In addition to the Primary Error Control Word, each slot contains three Power Control Increment bits. As discussed in further detail below, these bits are used by the base unit to transmit output gain feedback to the terminal units. The base unit monitors the received signal strength of the terminal units and sends a Power Control Increment instruction back to either increase output gain, decrease output gain, or leave the gain level unchanged. In a preferred embodiment, The three Power Control Increment bits decode as follows: 010=+6 dB; 000=+4 dB; 011=+2 dB; 110=0 (no change); 001=−2 dB; 100=−4 dB; 111=−6 dB; and 101=−8 dB.

When coded using a convolution code of rate ½, the 37 Primary Error Control Word bits plus the three Power Control Increment bits, result in a total of 80 coded bits per slot, which occupy the 20 symbols reserved for control information.

The above discussed preferred embodiment uses a modified LTR trunking protocol. As will be apparent to one skilled in the art, other protocols can be used as well in other embodiments of the present invention.

FIG. 7(d) illustrates the organization of the sixteen Control symbols (shown in FIG. 7(c)) for the reverse channel, i.e. transmitted by a terminal unit. Each frame consists of two slots (Row 1). Each Error Control Word extends across a single slot. The LTR Words extend across both slots and contain 33 bits. These bits are organized as: one bit for AREA; 14 bits for the INUSE signal which indicates what channel the terminal is transmitting on; and five bits for the HOME signal and eight bits for the ID signal, both of which identify a particular terminal or group of terminal. Additionally, the LTR Words include five bits for the PASS signal, which distinguishes a base generated signal from a terminal generated signal. Each slot also contains seven CRC bits which provide for error detection and five (slot 1) or six (slot 2) System Control bits. A one bit per slot Slot Counter (Row 8) provides either a 1 or a 0, with a 0 indicating the first slot of the Error Control Word and a 1 indicating the second slot of the Error Control Word. Two Power Indicator bits (Row 9) indicate the output gain of the terminal unit as follows: 11=maximum power; 10=power higher than 50%; 01=power lower than 50%; and 00=minimum power.

Additional details regarding the System Control Bits are provided with reference to FIG. 7(e). An advantageous feature of the preferred embodiments is the ability to adapt to changing demands and performance requirements. The system control bits provide a method for enhancing the flexibility. As illustrated in FIG. 7(c) there are a total of sixteen system control bits per each primary error control word, eight in each time slot.

Three exemplary categories of information are illustrated for the system control bits: service option; frequency; and base system gain. The four most significant bits are used for defining which category of information is contained in the following twelve bits. With twelve bits, over four thousand different options can be defined. For example, the service option bits can re-program the type of signaling protocol the system will use. While the preferred embodiments use LTR protocols, other protocols can be defined using the service option bits, such as Digital Coded Squelch Signaling, paging protocols, short message text, Cellular Digital Packet Data Protocol (CDPD) and the like. Other information can be encoded into the service option bits, such as options related to the vocoder rate.

The frequency bits are used to define what RF channel the device is transmitting on. The Base System Gain bits are sent from the base unit to the terminals and provide information to the terminals regarding the conversion gain of the base station. This information is used in an open loop power control arrangement, as will be discussed in more detail below.

Other categories of system control bits could include defining the sub-channel the device is transmitting on, red slot/blue slot allocation control, control bits for merging multiple sub-channels together for increased capacity, battery saving control signals, and the like.

Details of preferred embodiments of the base unit and terminal units are provided in the following descriptions. FIGS. 8(a) through 8(e) provide block diagrams of several major components of an exemplary base unit 102. A skilled practitioner will note that several components of a typical radio transmitter/receiver not necessary to an understanding of the invention have been omitted. Note that many of the features and functions discussed below can be implemented in software running on a digital signal processor or microprocessor, or preferably a combination of the two.

Figure 8A:
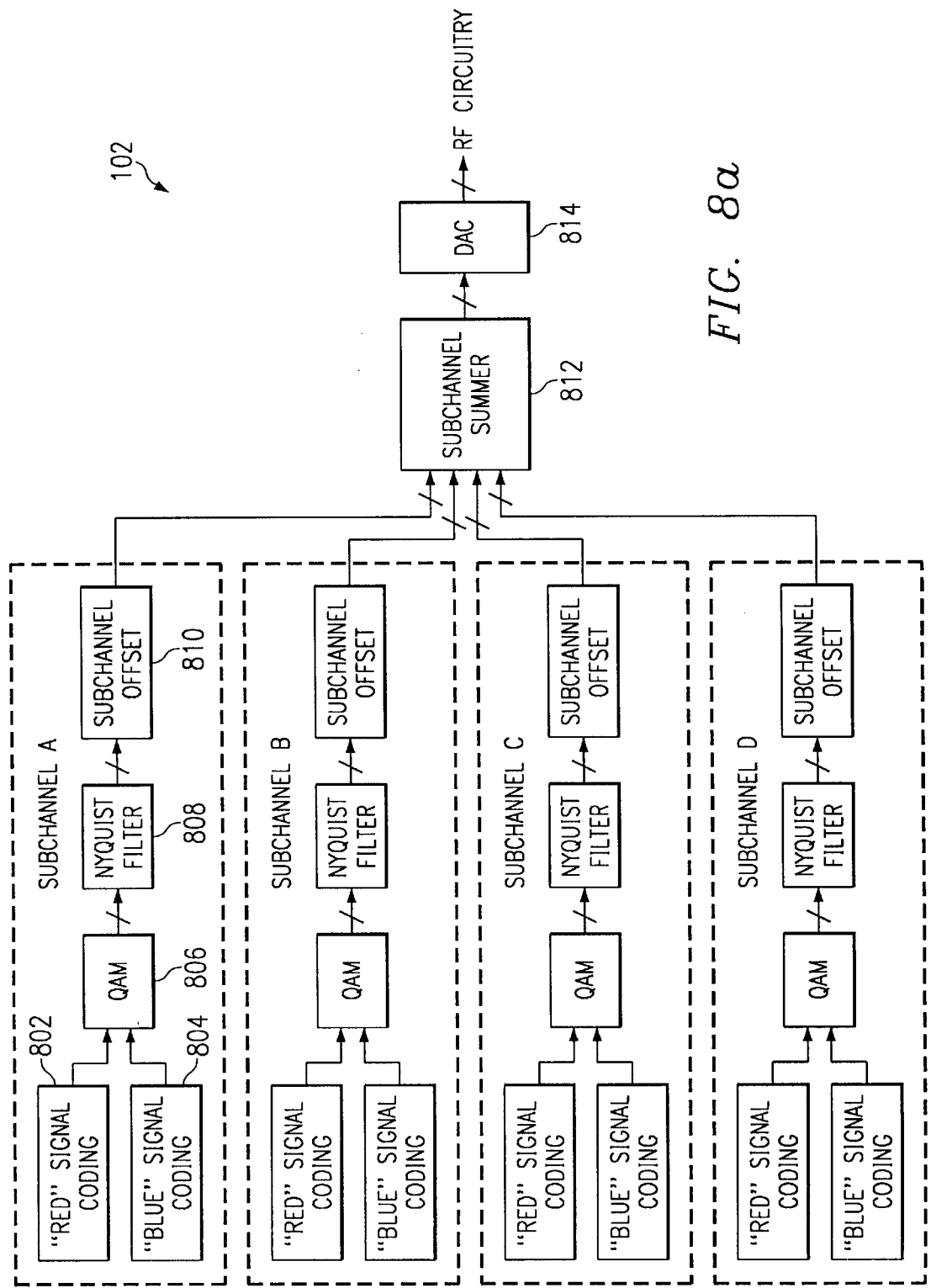
Figure 8D:
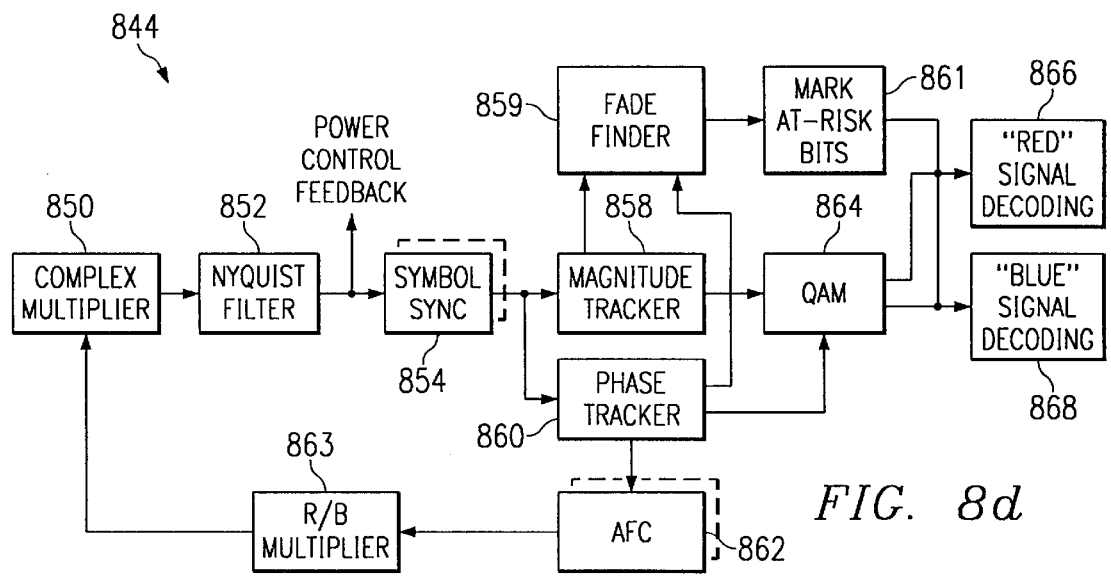
Figure 8E:
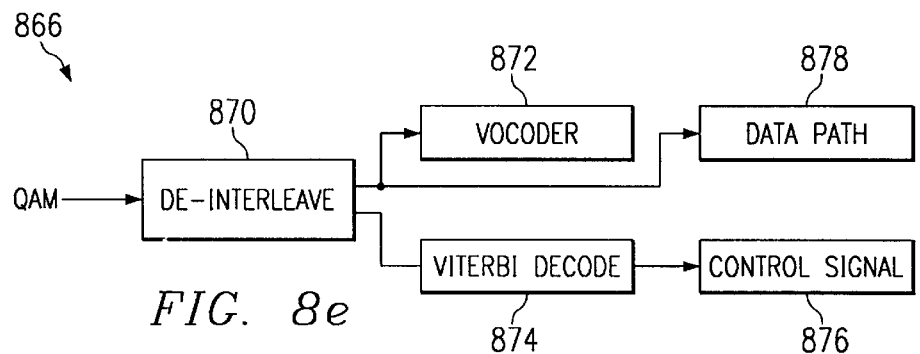

FIG. 8(a) illustrates the four sub-channel architecture of the base unit 102 operating in transmitter mode. The following explanation will be addressed to sub-channel A, although the teachings apply to the other sub-channels as well. Sub-channel A includes "red" signal coding block 802 and "blue" signal coding block 804. As discussed above, "red" and "blue" are arbitrary designations for the first and second time slots. Details regarding the signal coding blocks are provided below with reference to FIG. 8(b). For the present purpose, it is sufficient to state that the signal coding blocks receive voice and/or data signals, encode those signals if necessary, combine control signals, and prepare the combined signals for passage to QAM modulator 806.

Modulator 806 modulates the received signal using a differential quadrature amplitude modulation (QAM) architecture employing a 16 point constellation. With a sixteen point constellation, each symbol mapped to the constellation represents four bits. In the preferred embodiments, the signal is differentially encoded using Gray coding. Details of such architectures are well known in the art. See, for instance, Webb et al., Modern Quadrature Amplitude Modulation (IEEE Press 1994). Various other QAM techniques are known in the art, including Star QAM, Square QAM, and Coherent QAM. Additionally, other encoding techniques such as Okunev encoding or Khvorostenko encoding could be used in lieu of Gray coding. Differential encoding implies that the information is encoded on the signal as the difference in phase between two adjacent symbols, rather than as the instantaneous value of the phase. Other embodiments of the invention could include other modulation techniques as are known in the art, provided the modulation provides for sufficient data rate (16 kb/s in the preferred embodiments) with acceptable signal quality (i.e. signal to noise ratio) for the desired application.

The in-phase and quadrature components of the QAM modulated signal (illustrated by the single line representing both signals, as indicated by the slash through each such signal path) are then passed to Nyquist filter 808 which provides a pulse shaping filter in order to limit the overall bandwidth of the transmitted signal. In the preferred embodiment, the Nyquist filter operates at a 65 times over-sampling rate, in order to simplify the analog filtering of digital images.

Additionally, the signal is multiplied in sub-channel offset block 810 by the sub-channel offset required for sub-channel transmission. With reference to FIG. 3, the offset for sub-channel A would be minus 7.2 kHz, for sub-channel B would be minus 2.4 kHz, for sub-channel C would be plus 2.4 kHz, and for sub-channel D would be plus 7.2 kHz.

The QAM modulated and filtered signal A is then combined with the modulated and filtered signals from sub-channels B, C, and D in sub-channel summer 812 before being passed to digital-to-analog converter 814 where the combined signals are converted to an analog signal. The signal is then passed to radio frequency circuitry (not shown) where the signal is modulated to RF and amplified for transmission, as is known in the art.

Details regarding the red and blue signal coding blocks are provided in FIG. 8(*b*). For clarity, only one exemplary block 802 is illustrated in FIG. 8(*b*), it being understood that the description applies to blocks 804 as well for each of the sub-channels. Signal coding block 802 includes codec (coder/decoder) 820, which receives an incoming analog voice signal and encodes it into a coded digital signal. The incoming voice signal could be received from a microphone or other I/O device, or from another terminal or base unit. The output of codec 806 is a digital signal sampled at a Nyquist rate of 8k samples per second.

This signal is input to vocoder 822 which uses signal analysis and compression algorithms to reduce the data rate to 4 kb/s. In the preferred embodiments, vocoder 822 is an Advanced MultiBand Excited vocoder, available from Digital Voice Storage, Inc. Vocoder 822 also adds forward error correction (FEC) bits to the data stream, as is well known in the art, bringing the signal rate to 6.4 kb/s.

In some instances, base unit 102 may be transmitting data, as opposed to or in addition to a voice signal, as indicated by data source block 824. Data may be received from digital circuitry within base unit 102, from a keyboard or other I/O means contained within the base unit, or from an external source, such as a digital transmission line, such as a T-1 telecommunications line attached to base unit 102 via network interface 108 (see FIG. 1(*b*)).

Power control and system control bits, discussed above with reference to FIGS. 7(*a*) through 7(*e*), are provided for in blocks 826 and 828, respectively. These bits are encoded in blocks 830 and 832, respectively. Encoding adds redundant bits to the signals for error correction. These encoded bits are then passed to bit interleaver 834 and interleaved with bits from data block 824 and/or vocoder 822 for purposes of signal robustness, as is known in the art.

Additionally, the data rate is doubled to 16 kb/s from 8 kb/s at this point. This is because the signal will be time division multiplexed with another signal (the "blue" signal) and hence will be transmitted for only half the time. In the preferred embodiment, bit interleaver 834 receives and buffers a continuous stream of data. A 60 ms block of the signal is then compressed by doubling the data rate so as to allow the 60 ms block of information to be transmitted in a single 30 ms time slot.

Additional details regarding the speech and channel coding functions are provided below with reference to the terminal unit, which employs a similar voice and channel coding scheme as provided with the base unit. The teaching provided herein with reference to the terminal unit applies equally to the base unit, unless as noted otherwise in the description. Likewise, the teachings herein regarding the operation of the base unit apply to the like functions of the terminal, unless otherwise noted.

FIGS. 8(*c*) through 8(*e*) illustrate base unit 102 operating in receiver mode. FIG. 8(*c*) provides a high level block diagram of the four sub-channel architecture. Signals from the terminal units are received by radio frequency (RF) receiving circuitry (not shown). A/D converter 840 receives the signal from the RF receiving circuitry and converts it to a digital signal, which is fed to each of the four sub-channel paths, 844, 845, 846, and 847. FIG. 8(*d*) illustrates the details of sub-channel A, 844 of FIG. 8(*c*). Note that these teachings apply equally to sub-channels B, C, and D, 845, 846, and 847, respectively. In complex multiplier 850, the frequency offset corresponding to the particular sub-channel (+/−2.4 kHz or +/−7.2 kHz) is removed from the incoming signal. The signal is then frequency channelized by the square root Nyquist matched filter 852.

The filtered signal is passed to Symbol Synchronization block 854, which calculates the proper sampling point where there exists no (or minimal) inter-symbol interference signal. This is accomplished by calculating the magnitude of the sample points over time and selecting the highest energy points (corresponding to the synchronized symbol sample points). Magnitude tracking (block 858) is performed in order to remove channel effects from the differential decoder by determining if a detected change in amplitude of the signal is based on the intended signal information or on fading of the signal caused by interference (Rayleigh fading). Based upon this determination, the threshold by which an incoming pulse is considered to be on the outer or inner ring of the QAM constellation (logically a "1" or a "0") is modified to adapt to the changing incoming signal quality.

Based upon the information provided by magnitude tracker 858, the likelihood that a bit is in error is calculated in fade finder block 859. Blocks determined to be a high risk of being in error are marked as "at-risk" bits in block 861. The "at-risk" bit information is fed forward to the appropriate one of red or blue signal decoding blocks 866 and 869 and is used by the decoding blocks' error correcting processes. Symbol synch block 854 also feeds phase tracker 860, which is discussed below.

The modulated signal is fed from magnitude tracker 858 to QAM modulator/demodulator 864, where the signal is demodulated to a digital base band signal before being passed to the appropriate one of red or blue signal decoding paths. Note that only one functional block is shown in FIG. 8(*d*) for each element of the path from Nyquist filter 852 to the red/blue decoding blocks. In practice, however two duplicate paths exist, one each for the red and blue signals. As a consequence Red/Blue multiplexer 863 is provided in the feedback path between Automatic Frequency Control block 862 and complex multiplier 850. This is because a different frequency correction factor will be determined for the incoming red and blue signals. The appropriate correction factor must be fed back to the complex multiplier when the desired signal (red or blue) is being received. Frequency control is provided in phase tracker 860 and AFC block 862. Details regarding frequency control are provided below.

Details regarding the signal decoding blocks 866, 868 for each of the four sub-channels 844, 845, 846, and 847 are provided in FIG. 8(*e*) for an exemplary signal decoding block 866. Signals from QAM demodulator 864 are received by de-interleaver 870, wherein the bits comprising the voice and/or data signal are separated from the bits comprising the control signal. Voice bits are passed to vocoder 872, where the signal is decoded and decompressed before being passed on to a codec (not shown) for further processing and conversion to an analog signal. Details regarding the vocoder and related circuitry are provided above with reference to FIG. 8(*b*). Data bits are forwarded to data path 878 for further processing, I/O, or transmission to other digital systems, such as a digital telecommunications line.

Control signals are passed from de-interleaver 870 to Viterbi decoder 874 where forward error correction bits are extracted. The control signals are then passed on to processing circuitry which responds to the information contained within the control signal, as illustrated by block 876.

Figure 8F:
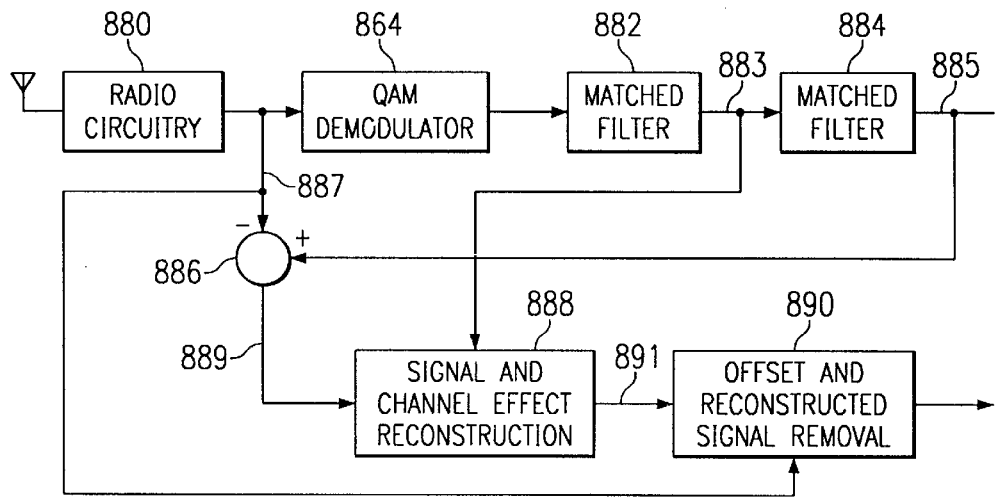
Figure 9A:
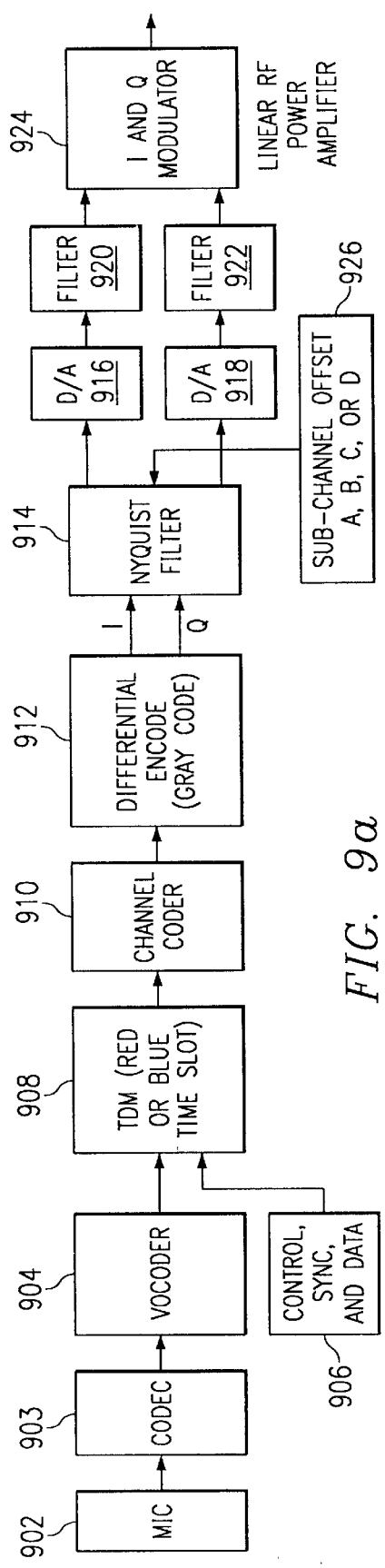
FIGS. 9(a) and 9(b) are block diagrams of a preferred embodiment terminal unit, in transmitting mode and receiving mode, respectively.
Figure 9B:
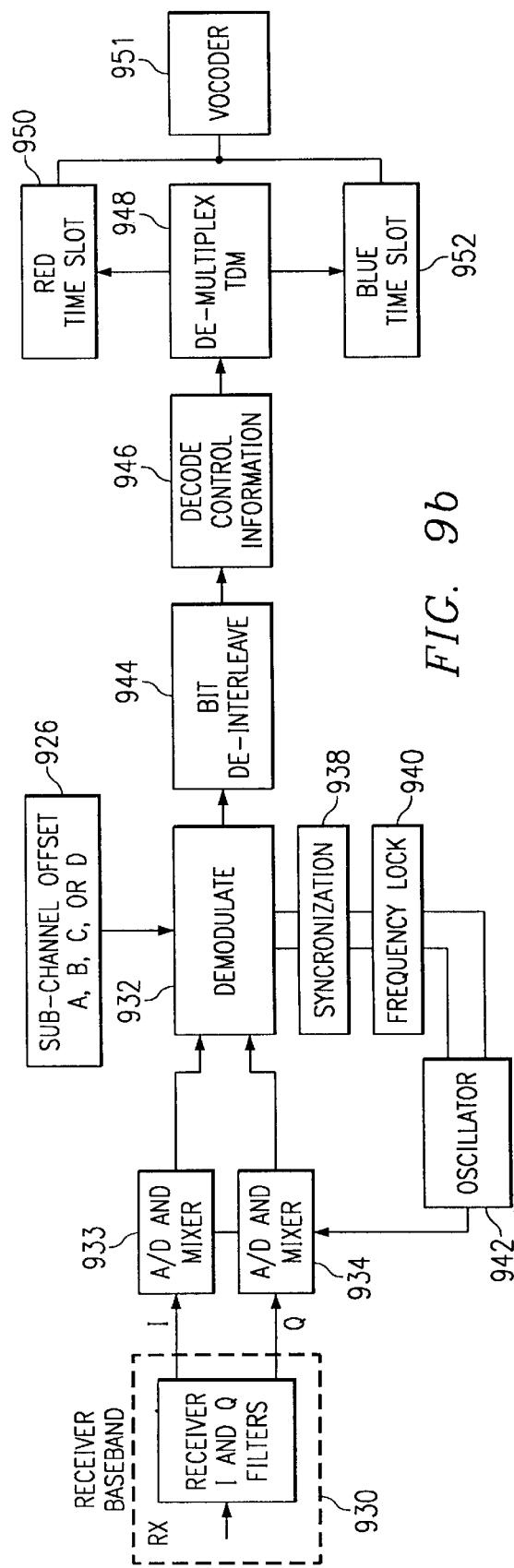

Details of the terminal unit are provided in FIGS. 9(*a*) and 9(*b*). As noted above, the following discussion provides additional details and is relevant to the description of the base unit as both units use similar schemes for voice coding, signal processing, and modulation. FIG. 9(*a*) illustrates in block diagram form the terminal unit acting as a transmitter. The end users audio input is received at microphone 902 and passed to vocoder 904 via codec 903. Vocoder 904 provides for coding, compression, and forward error correction functions, as discussed above with reference to FIG. 8(*b*). The signal is then passed to TDM formatter 908 along with control and synchronization bits from block 906 as well. The combined signals from vocoder 904 and control and synch block 906 are up-converted in TDM formatter block 908 to double the data rate. The signal is then passed to channel coder 910, where control and sync information is added to the signal and the bits are interleaved in order to make the transmitted signal less susceptible to noise, as is well known in the art.

The signal is modulated using QAM modulation(as described above) in block 912, as described above with reference to FIGS. 8(*a*) through 8(*e*) The in-phase and quadrature components of the QAM modulated signal are then passed to Nyquist filter 914 which provides a pulse shaping filter in order to limit the overall bandwidth of the transmitted signal. In the preferred embodiment terminal unit, the Nyquist filter operates at a 65 times over-sampling rate, in order to simplify the analog filtering of the digital image.

After passing through the Nyquist filter, the signal is multiplied by the frequency offset required for the sub-channel upon which the signal is to be transmitted (complex multiplier discussed above). With reference to FIG. 3, the offset for sub-channel A would be minus 7.2 kHz, for sub-channel B would be minus 2.4 kHz, for sub-channel C would be plus 2.4 kHz, and for sub-channel D would be plus 7.2 kHz. The offset signal is supplied by sub-channel offset block 926, which selects the sub-channel offset based upon instructions received from the base unit or upon pre-programmed instructions contained within the terminal unit's non-volatile memory.

Note that only a single QAM modulator is required for the terminal unit. This is because the terminal unit will only transmit on one sub-channel at any given time, as opposed to the base unit, which broadcasts over all sub-channels simultaneously.

The in-phase signal is fed to D/A converter 916 and the quadrature component is fed to D/A converter 918 where the signals are converted to analog signals. Filters 920 and 922 filter out spectral images that arise from the Nyquist over-sampling. Finally, the signals are fed to I & Q modulator 924 where the signals are modulated to radio frequency before being passed to RF transmitting circuitry (not shown).

FIG. 9(*b*) illustrates the terminal unit functioning as a receiver. Signals from the base unit or another terminal unit are received by RF receiving circuitry 930 where the RF signal is down-converted and filtered before being passed to A/D converter and mixer 933 for the in-phase component and 934 for the quadrature component. Also at this point, the frequency offset associated with the sub-channel selection is removed from the signal components by mixing into the received signal a signal complementary to the offset signal. The complementary offset signal is determined by sub-channel frequency offset control information, as illustrated by block 926 and depends on the sub-channel upon which the terminal unit is receiving. The digital signals are then demodulated to a real binary signal in demodulator 932. The digital binary signal is then de-coded in blocks 944 and 946 using Viterbi decoding. The signal is then de-multiplexed in the time domain, wherein the data rate is reduced from 16 kb/s to 8 kb/s before being converted to an analog audio signal and reproduced by a speaker or similar end-user interface (not shown), or in the case of data before being displayed on an end-user interface such as an LCD display. Note that only one time slot 950 or 952 will be active at any given time and will drive the end-user interface(s).

A further advantageous feature of the preferred embodiments is the ability of the terminal unit to automatically lock onto and center on the frequency received from the base unit. The significance of this feature is that typical commercially available oscillators have an accuracy on the order of plus or minus two parts per million. In the range of 850 MHz and beyond, this means the oscillator may be accurate to only within 1700 Hz. This inaccuracy is on the order of less than ten percent for a 25 kHz channel. For a 4 kHz sub-channel, however, a 1700 Hz or more error in the oscillator, coupled with Doppler shift and other frequencies shifts that occur in RF transmissions, and the signal frequency deviation could be greater than the bandwidth of the sub-channel itself (i.e. greater than plus or minus 2 kHz). To prevent this, the terminal unit locks on to the signal received from the base unit, rather than rely upon a local frequency reference.

Automatic frequency lock is accomplished when the terminal unit is first powered on and initiates contact with the base unit. As discussed above, in response to a first attempt to establish communication by a terminal unit, the base unit will (provided the terminal unit is authorized for the system) send an acknowledgement. This acknowledgement will be sent over the sub-channel which the terminal unit is monitoring. The received signal can be analyzed using a digital signal processor by applying spectral analysis to the signal in order to find the zero points of the signal in the frequency domain. With reference to FIG. 3, zero points are seen to occur at the two ends of the sub-channel. By analyzing the energy difference at the end-points of the spectrum band at the zero points, again using spectral analysis, the center frequency of the sub-channel can be determined. The difference between the center frequency of the received signal and the frequency being output by the oscillator provides an error signal that can be fed back to the oscillator via synchronization and frequency lock circuits 938, 940 of FIG. 9(*b*), to adjust the oscillator 942 and lock it in onto the calculated center frequency of the received signal.

Figure 10:
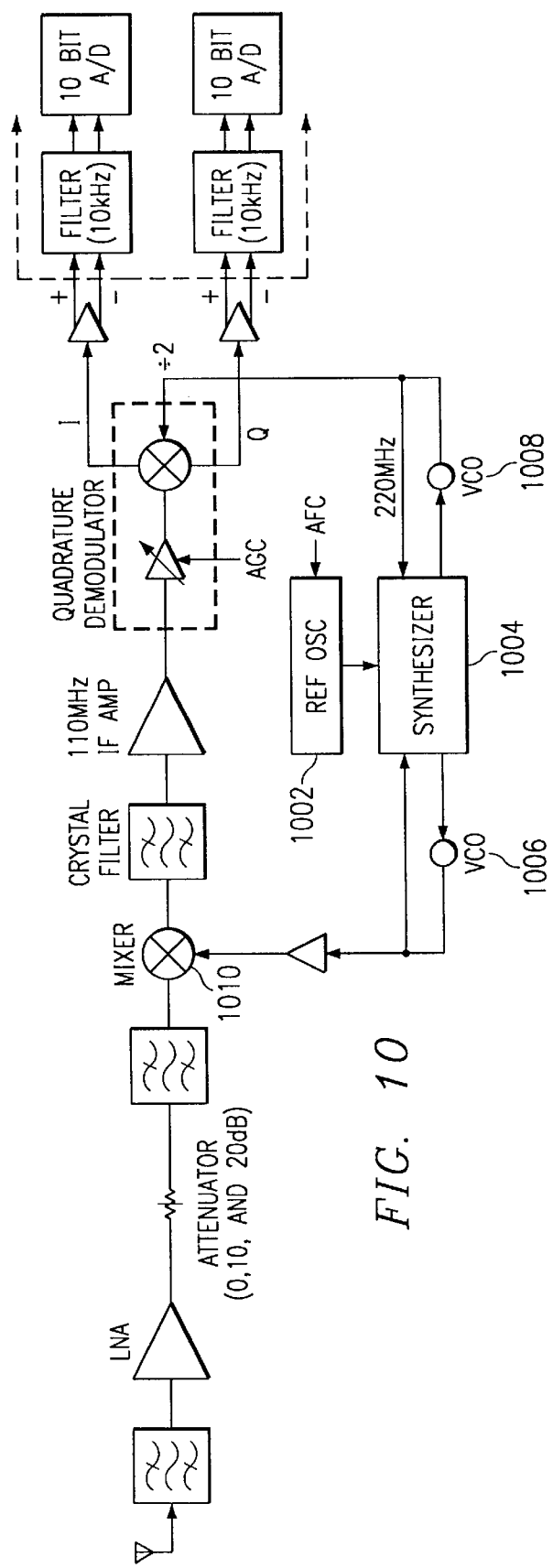
FIG. 10 illustrates in block diagram format the RF and demodulation circuitry of a terminal unit.

Continuous fine frequency control is also provided for as indicated by blocks 860 and 862 of FIG. 8(*d*) and block 940 of FIG. 9(*b*). Fine frequency control is accomplished by tracking unintentional rotation of the star QAM constellation in phase tracker 860. In the constellation, the symbols are phase shifted from each other in multiples of 45°. When the phase shift varies from multiples of 45°, then frequency adjustment must be made. In the base unit, which has an accurate and stable oscillator, the incoming symbols are digitally rotated to bring the phase shift between symbols back to 45° multiples. In the terminal, however, the oscillator is typically more prone to inaccuracies. Fine frequency control is accomplished by feeding back the error signal arising from the phase shift to the reference oscillator 1002 of FIG. 10, which in turn feeds the error signal back to voltage controlled oscillators 1006 and 1008. VCO 1006 drives complex mixer 1010, which provides the appropriate channel offset function. Sub-channel offset is accomplished digitally as described above with reference to sub-channel offset block 926.

Slot and symbol synchronization is provided for in block 938. Symbol synchronization is accomplished first. Symbol synchronization is accomplished by sampling the incoming signal and time averaging the samples. Then, the sample points with the highest average power at the over sample rate are detected. Preferably, the actual sample point is determined using a quadratic interpolation based on the three sample points with the highest average power. Symbols can then be identified using known digital signal processing techniques.

Once the receiver has synchronized on the symbol time and locations, slot synchronization is accomplished using the slot sync symbols discussed above with reference to FIG. 7(c) by identifying patterns representing the known sync symbols, which should repeat every 120 symbols (i.e. every time frame).

Further details regarding sub-channel interference cancellation will now be provided. As discussed above, sub-channel interference can degrade the signal received on a given sub-channel. This problem is exasperated when adjacent sub-channels have differing signal levels. One method of eliminating (or at least minimizing) sub-channel interference is to calculate the signal corruption that is imposed by channel imperfections (Raleigh effects and the like) for a given sub-channel and to re-construct the signal that was transmitted by the terminal unit transmitting on that sub-channel. The signal corruption can then be added to the reconstructed transmitted signal and this sum then subtracted from the composite signal that was received by the base unit. In this way, the effects of a the sub-channel and its associated channel corruption on the remaining sub-channels are partially eliminated. Preferably, this process can be performed for each sub-channel in order to remove its effects from the remaining sub-channel signals. Also preferably, the sub-channel with the highest received signal strength should be processed first as this channel will likely create the greatest interference on the other sub-channels and hence will decrease the accuracy of the reconstructed signals on those weaker sub-channels.

FIG. 8(f) illustrates a preferred embodiment method of eliminating excessive sub-channel to sub-channel interference. Radio circuitry 880 receives the incoming signal from multiple terminals. In the preferred embodiments, four terminals broadcast simultaneously in the channel. The signal received by radio circuitry 880, therefore, is a composite of four sub-channel signals. This signal is passed to demodulator 864 where the signal is demodulated. The following discussion assumes that sub-channel A has the highest received signal strength (at the base station) and hence the process will begin with removing the interference effects of sub-channel A from the remaining sub-channels.

Nyquist filters 882 and 884 are matched to the filter characteristics of the terminal units transmitting to base station 102. By re-modulating the signal received from demodulator 864, filter 882 outputs a signal 883 that approximates the signal transmitted by terminal unit A (corresponding to the terminal unit that transmitted the signal on sub-channel A). This signal is then passed to another matched filter 884, which re-demodulates signal 883. Because the output from modulator filter 882 passes directly to demodulator filter 884, this demodulation process outputs the received signal with no channel effects (in other words the "channel" between filters 882 and 884 is "ideal"). Filter 884 outputs signal 885, which again, corresponds to the received signal with no channel effects.

The complex difference between the received signal 887 and the received signal with no channel effects 885 is calculated as shown by complex adder 886. Output signal 889 corresponds to the channel effects or signal corruption that was imposed on the signal during transmission. In block 888, signal 889 is combined with signal 883 (corresponding to the reconstructed signal transmitted by terminal A) in order to reconstruct the signal transmitted by terminal A with the signal corruption imposed on sub-channel A. In block 890, the reconstructed signal is first offset by the appropriate offset frequency corresponding to sub-channel A, and the re-constructed signal is then subtracted from the composite received signal 887. In this way, not only is the effects of the signal on sub-channel A removed from the other sub-channels, but the effects of signal corruption imposed on sub-channel A is removed as well.

The above described steps can be repeated for each of the sub-channels, the effects of which are sought to be removed. In other words, in order to minimize the effects of sub-channels, A, B, and C from the signal on sub-channel D, the above steps (described for sub-channel A) would be repeated for sub-channels B and C. Preferably, the sub-channel having the weakest received signal would be handled first. In the above example, sub-channel D is taken as having the weakest received signal, and hence the effects of sub-channel interference are removed from that signal first. This process can then be repeated in order to remove the effects of sub-channels A, B, and D from sub-channel C, and so on. If necessary, the process can be performed iteratively until an acceptable level of sub-channel interference cancellation has been obtained.

Another advantageous feature of the preferred embodiments is the ability to automatically control the output gain of the terminal units based upon the strength of the signal received at the base unit. As discussed above, it is necessary to keep the signal level of the signals received on the sub-channels approximately equal (or as near to equal as possible) to minimize the interference between sub-channels. Referring to FIG. 3, this drawing presents an idealized signal where the entire energy of a given signal is contained within its 4 kHz bandwidth. In reality, considerable energy is also transmitted outside the 4 kHz bandwidth. Even with guard-bands, some energy from one sub-channel will be transmitted in the bandwidth of the adjacent sub-channel. This out-of-band energy is typically highly attenuated with respect to the in-band energy, typically on the order of minus 20 dB relative to the in-band energy. If the signal being received on sub-channel A is as strong as the signal being received on sub-channel B, for instance, then the interference caused by out-of-band transmissions from sub-channel B, being 20 dB down, would not cause significant interference with signal reception on sub-channel A.

Note in FIG. 3, however that the signal being received on sub-channel C is considerably weaker than the signal being received on sub-channel D (and sub-channel B as well). This weak signal may be caused by the terminal unit transmitting on sub-channel C being further away from the base unit than the other terminal units. The weak signal on sub-channel C is much more susceptible to the interference caused by the out-of-band transmissions from sub-channels B and D. To compensate for this a gain control feedback loop is established between the base unit and the terminal units.

Both open loop and closed loop power control is utilized to regulate the power outputs of the various terminals transmitting on a given channel. Open loop control is accomplished as follows. Upon acquisition of a signal from the base unit, the terminal receives control bits from the base unit corresponding to the Base System Gain of the base unit. The terminal also calculates the strength of the received signal, using techniques known in the art. By comparing the values of the power of the signal transmitted by the base station with the strength of the received signal, the terminal can estimate the losses in the system and can hence estimate the necessary output gain required to generate a sufficient signal for transmission back to the base unit. The terminal then transmits a signal back to the base unit using the output gain determined from these calculations. By using open loop control, a gross power adjustment for the terminal is obtained.

After the terminal transmits to the base unit, closed loop power control is initiated as follows. The signal strength received by the base unit is determined after the signal has passed through the Nyquist filter 852. The detected signal strength is then compared to a threshold value that is stored in memory contained within base unit 102 (not shown). When the signal strength falls below the threshold value, the base unit instructs the terminal unit to increase its output gain. Likewise, if the received signal is above some other threshold value, the base unit instructs the terminal to decrease its output gain. These instructions are provided via the Power Control Increment bits discussed above with reference to FIG. 7(c).

The output gain control functions also provide the advantage of increasing the battery life of the terminal units, as the base unit will continuously monitor the received signal and will instruct the terminal unit to only provide as much output gain as is necessary for signal clarity. In this way, the power consumed by the output circuitry of the terminal unit is minimized.

An advantageous feature of the preferred embodiments is the ability to take advantage of time division multiplexing to transmit power control information on the forward channel during those time slots when the terminal is not transmitting. In this way, the terminal can be greatly simplified by avoiding the need for a duplexer.

In alternative embodiments, power control and regulation could be based upon indications other than the received signal strength. For instance, the output power of the terminal can be estimated and controlled based upon the bit error rate (BER) of the signal received by the base unit. Based upon the BER of the received signal, the base unit will instruct the terminal to increase or decrease its output gain. In yet another alternative embodiment, power control can be supplemented by increasing the software vocoder forward-error-correction by increasing the packet size or limiting overhead information in order to obtain improved signal to noise ratio. This will, in effect, increase the range of the terminal even when its power output limits are otherwise reached. In yet another alternative embodiment, power control is effectively supplemented through varying the vocoder data rate. As the terminal nears the base station, the vocoder rate can be lowered in order to narrow the bandwidth of the signal that needs to be transmitted. In this way, the stronger signals can be pulled in toward the center of the sub-channel to further minimize interference with neighboring sub-channels.

The foregoing detailed description of preferred embodiments is intended by way of example only and is not intended to limit the scope of the invention defined in the appended claims.

We claim:

1. A method of transmitting N information signals over a single pre-defined frequency channel having a bandwidth of BWc, each of the N information signals being transmitted on a single sub-channel of bandwidth BWsc, comprising:
   a. modulating each of N information signals to form N modulated signals, each having a bandwidth equal to or less than $(BWc-BW_{GB})/N$, wherein $BW_{GB}$ corresponds to the collective bandwidth of guardbands inserted between adjacent sub-channels and inserted at each end of the bandwidth of the pre-defined frequency channel, each modulated information signal having a center frequency of $F_c$, wherein said modulating is accomplished using differential modulation, and wherein each of the N modulated signals is comprised of symbols, the value of each symbol being determined by reference to a preceding symbol;
   b. offsetting the center frequency of each modulated signal by a frequency offset individual to that modulated signal, the frequency offset being different for each modulated signal;
   c. combining the modulated signals to form a composite signal; and
   d. transmitting the composite signal to a terminal.

2. The method of claim 1 wherein the modulating step comprises mapping groups of bits of each information signal onto a quadrature amplitude modulation constellation and passing the resulting data stream through a Nyquist filter.

3. The method of claim 2 wherein said quadrature amplitude modulation constellation is a differential sixteen point star constellation.

4. The method of claim 1 wherein said modulating step and said offsetting step are effected simultaneously.

5. A method of communicating N information signals over a single pre-defined frequency channel having a bandwidth of BWc, each of the N information signals being transmitted on a single sub-channel of bandwidth BWsc comprising the steps of:
   a. modulating each of N information signals to form N modulated signals, each having a bandwidth equal to or less than $(BWc-BW_{GB})/N$, wherein $BW_{GB}$ corresponds to the collective bandwidth of guardbands inserted between adjacent sub-channels and inserted at each end of the bandwidth of the pre-defined frequency channel, each modulated information signal having a center frequency of $F_c$, wherein said modulating is accomplished using differential modulation, and wherein each of the N modulated signals is comprised of symbols, the value of each symbol being determined by reference to a preceding symbol;
   b. offsetting the center frequency of each modulated signal by a frequency offset individual to that modulated signal, the frequency offset being different for each modulated signal;
   c. combining the modulated signals to form a composite signal;
   d. transmitting the composite signal;
   e. receiving the composite signal at a terminal;
   f. offsetting the center frequency of the received composite signal to re-center to Fc a first selected one of the modulated information signals comprising the composite signal;
   g. filtering the composite signal to remove the modulated information signals not re-centered to Fc; and
   h. demodulating the first selected one of the modulated information signals.

6. The method of claim 5 further comprising the steps of:
i. offsetting the center frequency of the received composite signal to re-center to Fc a second selected one of the modulated first information signals comprising the composite signal;
j. filtering the received composite signal to remove the modulated information signals not re-centered to Fc; and
k. demodulating the second selected one of the modulated information signals.

7. The method of claim 5 further comprising the steps of:
i. time division multiplexing the information signals prior to the modulating step of step a such that each information signal comprises two or more communications signals, and
j. time division de-multiplexing the demodulated first selected one of the modulated information signals.

8. A transmission apparatus for transmitting N information signals over a pre-defined frequency channel, having a bandwidth of $BW_c$, comprising:
a. N information signal inputs to receive at least N information signals;
b. N differential modulators, each coupled to a corresponding one of the N information signal inputs wherein each of the information signals is differentially modulated to form a single differentially modulated sub-channel signal, each having a center frequency Fc and a bandwidth BWsc, wherein each of the differentially modulated signals is comprised of symbols, the value of each symbol being determined by reference to a preceding symbol;
c. N sub-channel frequency offset multipliers, each coupled to a corresponding one of the N modulators to receive a differentially modulated sub-channel signal and offset its center frequency from Fc by one of N unique sub-channel offset frequencies;
d. a sub-channel summer coupled to the N sub-channel frequency offset multipliers to receive said N offset differentially modulated sub-channel signals and combine them to form a composite signal; and
e. a transmitter coupled to said summer to receive said composite signal and transmit it over said pre-defined frequency channel.

9. The apparatus of claim 8 wherein the information signal comprises a plurality of time division multiplexed signals.

10. The apparatus of claim 8 wherein the modulators, sub-channel frequency offset multipliers, and sub-channel summer are realized in digital signal processing circuitry.

11. The apparatus of claim 8 wherein the information signals comprise digitized voice signals.

12. The apparatus of claim 8 wherein the information signals comprise control signals directed to a terminal receiving the composite signal.

13. The apparatus of claim 8 wherein each differentially modulated sub-channel signal is offset from its center frequency $F_c$ by an offset frequency $F_n$ calculated as:

for odd numbered sub-channel offsets $F_n = N/2(BW_{SC}+(N+1)BW_{GB})$, and for even numbered sub-channel offsets $F_n = -(N-1)/2(BW_{SC}+(N+1)BW_{GB})$, wherein $BW_{GB}$ is the bandwidth of guardbands inserted between adjacent sub-channels.

14. The transmission apparatus of claim 8 wherein N information signals are transmitted over a first pre-defined frequency channel and K additional information signals are transmitted over a second pre-defined frequency channel.

15. The apparatus of claim 8 wherein said pre-defined frequency channel has a bandwidth of 25 kHz and N equals four.

16. The apparatus of claim 8 wherein said pre-defined frequency channel has a bandwidth of 12.5 kHz and N equals two.

17. The apparatus of claim 8 wherein the N information signals are logically organized as sequential time frames, each time frame comprising:
a. a first time slot containing a first signal intended for a first terminal;
b. a second time slot containing a second signal intended for a second terminal.

18. The apparatus of claim 17 wherein each time frame further comprises a third time slot containing control information, the control information being associated with at least one of the first and second time slots and being directed to a terminal receiving at least one of the N information signals.

19. The apparatus of claim 17 wherein at least one of the first and second time slots contains data and control signals.

20. A receiver apparatus for receiving one of N differentially modulated information signals forming a modulated composite signal and transmitted over a pre-defined frequency channel, each of said N information signals comprising a series of symbols, comprising:
a. a receiver for receiving the composite signal;
b. a sub-channel offset controller coupled to said receiver wherein the composite signal is offset by a sub-channel offset corresponding to a first desired one of the differentially modulated N information signals;
c. a demodulator coupled to the offset controller wherein the first desired one of the differentially modulated N information signals is filtered and converted to a digital data stream, said filtering including determining the value of the symbols comprising the differentially modulated information signal with reference to a preceding symbol.

21. The apparatus of claim 20 wherein:
a. the sub-channel offset controller offsets the composite signal by a second sub-channel offset corresponding to a second desired one of the N information signals; and
b. the demodulator filters and converts to a digital data stream the second one of the desired information signals.

22. The apparatus of claim 20 wherein said information signal comprises a plurality of time division multiplexed communication signals and further comprising: a time division demultiplexer wherein the time division multiplexed communication signals are logically separated into individual communication signals.

23. A method for transmitting a digital data stream having a data rate R, over N pre-defined frequency channels:
a. dividing the N pre-defined frequency channels into two or more sub-channels, each sub-channel being offset from the center of its associated frequency channel by a unique frequency offset, and each sub-channel having a data capacity equal to C;
b. allocating a sufficient number of sub-channels, Y, to transmit the digital data stream, such that Y*C=R;
c. apportioning the digital data stream over the Y sub-channels; and d. simultaneously transmitting the digital data stream over the Ysub-channels comprising the N pre-defined frequency channels.

24. The method of claim 23 wherein other sub-channels are allocated for transmission of other digital data streams.

25. The method of claim 23 wherein other sub-channels are allocated for transmission of voice communications.

26. The method of claim 23 wherein the multiple pre-defined frequency channels are contiguous.

27. The method of claim 23 wherein said pre-defined frequency channels are government licensed portions of the RF spectrum.

28. The method of claim 23 wherein said pre-defined frequency channels are 25 kHz, 12.5 kHz, or 6.25 kHz in bandwidth.

29. The method of claim 23 further comprising the steps of:
   a. simultaneously receiving the signal transmitted on the N sub-channels; and
   b. re-constructing the digital data stream from the N portions received.

30. A system for transmitting N information signals over a single pre-defined frequency channel having a bandwidth of BWc, each of the N information signals being transmitted on a single sub-channel of bandwidth BWsc, comprising:
   a base unit comprising:
      N signal inputs to receive at least N information signals, at least one of the N information signals being independent from each other of the N information signals;
      N differential modulator, each coupled to a corresponding one of the N information signal inputs wherein each of the information signals is differentially modulated to form a single differentially modulated sub-channel signal, each having a center frequency $F_c$ and a bandwidth BWsc, wherein each of the differentially modulated signals is comprised of symbols, the value of each symbol being determined by reference to a preceding symbol;
      N sub-channel frequency offset multipliers, each coupled to a corresponding one of the N modulators to receive a differentially modulated sub-channel signal and offset its center frequency from $F_c$ by one of N unique sub-channel offset frequencies;
      a sub-channel summer coupled to the N sub-channel frequency offset multipliers to receive said N offset differentially modulated sub-channel signals and combine them to form a composite signal;
      a radio transmitter coupled to the sub-channel summer wherein the composite signal is transmitted to one or more mobile units over a wireless medium;
   a first mobile unit comprising:
      a radio receiver for receiving the composite signal;
      a sub-channel offset controller coupled to said radio receiver wherein the composite signal is offset by a first sub-channel offset corresponding to a first one of the at least one independent information signals and each of the other N information signals is filtered out;
      a demodulator coupled to the offset controller wherein the first one of the at least one independent information signals is filtered and converted to a digital data stream; and
   a second mobile unit comprising:
      a second radio receiver for receiving the composite signal;
      a sub-channel offset controller coupled to said radio receiver wherein he composite signal is offset by a second sub-channel offset corresponding to a second one of the at least one independent information signals and each of the other N information signals is filtered out;
      a demodulator coupled to the offset controller wherein the second one of the at least one independent information signals is filtered and converted to a digital data stream.

31. The system of claim 30 wherein said digital data stream comprises a voice signal.

32. The system of claim 30 wherein the number of sub-channels comprising a pre-defined frequency channel is selectable.

33. The system of claims 30 wherein the at least one independent information signal comprises a separate communication path from each other of the N information signals.

* * * * *